United States Patent
Hayashi et al.

(10) Patent No.: US 11,550,048 B2
(45) Date of Patent: Jan. 10, 2023

(54) MOBILE DEVICE-BASED RADAR SYSTEM FOR PROVIDING A MULTI-MODE INTERFACE

(71) Applicant: Google LLC, Mountain View, CA (US)

(72) Inventors: Eiji Hayashi, Cupertino, CA (US); Vignesh Sachidanandam, Redwood City, CA (US); Leonardo Giusti, San Francisco, CA (US); Jaime Lien, Mountain View, CA (US); Patrick M. Amihood, Palo Alto, CA (US); Ivan Poupyrev, Los Altos, CA (US)

(73) Assignee: Google LLC, Mountain View, CA (US)

( * ) Notice: Subject to any disclaimer, the term of this patent is extended or adjusted under 35 U.S.C. 154(b) by 244 days.

(21) Appl. No.: 16/771,647

(22) PCT Filed: May 20, 2019

(86) PCT No.: PCT/US2019/033116
§ 371 (c)(1),
(2) Date: Jun. 10, 2020

(87) PCT Pub. No.: WO2020/236148
PCT Pub. Date: Nov. 26, 2020

(65) Prior Publication Data
US 2021/0088643 A1 Mar. 25, 2021

(51) Int. Cl.
*G01S 13/42* (2006.01)
*G01S 13/88* (2006.01)
*G06F 3/01* (2006.01)

(52) U.S. Cl.
CPC .............. *G01S 13/42* (2013.01); *G01S 13/88* (2013.01); *G06F 3/011* (2013.01)

(58) Field of Classification Search
None
See application file for complete search history.

(56) References Cited

U.S. PATENT DOCUMENTS

| 4,843,351 A | 6/1989 | Edwards et al. |
| 4,912,477 A | 3/1990 | Lory et al. |

(Continued)

FOREIGN PATENT DOCUMENTS

| CN | 1529970 | 9/2004 |
| CN | 1894981 | 1/2007 |

(Continued)

OTHER PUBLICATIONS

Pursuant to MPEP § 2001.6(b) the applicant brings the following co-pending application to the Examiner's attention: U.S. Appl. No. 16/903,349.

(Continued)

*Primary Examiner* — Whitney Moore
(74) *Attorney, Agent, or Firm* — Colby Nipper PLLC

(57) ABSTRACT

This document describes techniques and systems that enable a mobile device-based radar system (104) for providing a multi-mode interface (114). A radar field (110) is used to enable a user device (102, 702) to accurately determine a presence or threshold movement of a user near the user device. The user device provides a multi-mode interface having at least first and second modes and providing a black display or a low-luminosity display in the first mode. The user device detects, based on radar data and during the first mode, a presence or threshold movement by the user relative to the user device and responsively changes the multi-mode interface from the first mode to the second mode. Responsive to the change to the second mode, the user device provides visual feedback corresponding to the implicit interaction by adjusting one or more display parameters of the black display or the low-luminosity display.

49 Claims, 16 Drawing Sheets

(56) References Cited

U.S. PATENT DOCUMENTS

| | | | |
|---|---|---|---|
| 6,633,254 | B1 | 10/2003 | Sutphin |
| 6,671,496 | B1 | 12/2003 | Hoshi |
| 7,092,690 | B2 | 8/2006 | Zancewicz |
| 7,142,829 | B2 | 11/2006 | Sung et al. |
| 8,798,695 | B1 | 8/2014 | Zheng et al. |
| 9,086,476 | B1 | 7/2015 | Schuss et al. |
| 9,689,967 | B1 | 6/2017 | Stark et al. |
| 10,247,809 | B2 | 4/2019 | Testar et al. |
| 10,845,477 | B2 | 11/2020 | Amihood et al. |
| 10,914,834 | B2 | 2/2021 | Amihood et al. |
| 11,175,718 | B2 | 11/2021 | Hayashi et al. |
| 2002/0003488 | A1 | 1/2002 | Levin et al. |
| 2003/0179138 | A1 | 9/2003 | Chen |
| 2007/0200747 | A1 | 8/2007 | Okai et al. |
| 2008/0204322 | A1 | 8/2008 | Oswald et al. |
| 2009/0180466 | A1 | 7/2009 | Soul et al. |
| 2009/0323782 | A1 | 12/2009 | Baker et al. |
| 2010/0245091 | A1 | 9/2010 | Margon |
| 2011/0074621 | A1 | 3/2011 | Wintermantel |
| 2011/0140949 | A1 | 6/2011 | Lee |
| 2011/0267958 | A1 | 11/2011 | Sekiya et al. |
| 2012/0001802 | A1 | 1/2012 | Grau Besoli et al. |
| 2012/0092205 | A1 | 4/2012 | Bourdelais et al. |
| 2012/0146796 | A1 | 6/2012 | Kenneth et al. |
| 2013/0069816 | A1 | 3/2013 | Ash et al. |
| 2015/0348493 | A1 | 12/2015 | Chae et al. |
| 2016/0034050 | A1 | 2/2016 | Ady et al. |
| 2016/0054436 | A1 | 2/2016 | Lee et al. |
| 2016/0103199 | A1 | 4/2016 | Rappaport |
| 2016/0109564 | A1 | 4/2016 | Sieber et al. |
| 2016/0204929 | A1 | 7/2016 | Shimizu et al. |
| 2016/0252607 | A1 | 9/2016 | Saboo et al. |
| 2017/0086202 | A1 | 3/2017 | Chen |
| 2017/0090011 | A1 | 3/2017 | West et al. |
| 2017/0097413 | A1 | 4/2017 | Gillian et al. |
| 2017/0201887 | A1 | 7/2017 | Farshchian et al. |
| 2017/0289766 | A1 | 10/2017 | Scott et al. |
| 2017/0307728 | A1 | 10/2017 | Eshraghi et al. |
| 2017/0366242 | A1 | 12/2017 | Lee et al. |
| 2018/0031673 | A1 | 2/2018 | Kim et al. |
| 2018/0095161 | A1 | 4/2018 | Kellum et al. |
| 2018/0329049 | A1* | 11/2018 | Amihood ............ G01S 7/4008 |
| 2018/0329050 | A1 | 11/2018 | Amihood et al. |
| 2018/0348339 | A1 | 12/2018 | Lien et al. |
| 2018/0348340 | A1 | 12/2018 | Lien et al. |
| 2018/0348353 | A1 | 12/2018 | Lien et al. |
| 2019/0114021 | A1 | 4/2019 | Oliver et al. |
| 2019/0120954 | A1 | 4/2019 | Kim et al. |
| 2019/0270410 | A1 | 9/2019 | Baur et al. |
| 2020/0393890 | A1 | 12/2020 | Hayashi et al. |
| 2021/0072375 | A1 | 3/2021 | Amihood et al. |
| 2022/0091658 | A1 | 3/2022 | Hayashi et al. |

FOREIGN PATENT DOCUMENTS

| | | |
|---|---|---|
| CN | 101354438 | 1/2009 |
| CN | 102087362 | 6/2011 |
| CN | 102301255 | 12/2011 |
| CN | 102323853 | 1/2012 |
| CN | 102741775 | 10/2012 |
| CN | 103416036 | 11/2013 |
| CN | 103534664 | 1/2014 |
| CN | 105445735 | 3/2016 |
| CN | 108885485 | 11/2018 |
| EP | 1548461 | 6/2005 |
| EP | 1775600 | 4/2007 |
| EP | 3043238 | 7/2016 |
| EP | 3073574 | 9/2016 |
| JP | 2013033191 | 2/2013 |
| JP | 2013044881 | 3/2013 |
| JP | 2016126234 | 7/2016 |
| JP | 2018050175 | 3/2018 |
| TW | I287367 | 7/2006 |
| WO | 9723063 | 6/1997 |
| WO | 2010099268 | 9/2010 |
| WO | 2014094928 | 6/2014 |
| WO | 2015184406 | 12/2015 |
| WO | 2017044038 | 3/2017 |
| WO | 2018208958 | 11/2018 |
| WO | 2018222266 | 12/2018 |
| WO | 2018222267 | 12/2018 |
| WO | 2018222268 | 12/2018 |
| WO | 2020236148 | 11/2020 |
| WO | 2020256692 | 12/2020 |

OTHER PUBLICATIONS

"Notice of Allowance", U.S. Appl. No. 16/903,349, dated Jul. 14, 2021, 8 pages.

"International Preliminary Report on Patentability", Application No. PCT/US2019/033116, dated Nov. 16, 2021, 8 pages.

"International Preliminary Report on Patentability", Application No. PCT/US2019/037529, dated Dec. 21, 2021, 9 pages.

"Corrected Notice of Allowability", U.S. Appl. No. 15/974,502, dated Jan. 7, 2021, 2 pages.

"Corrected Notice of Allowance", U.S. Appl. No. 15/974,528, dated Oct. 27, 2020, 2 pages.

"Non-Final Office Action", U.S. Appl. No. 16/903,349, dated Jan. 21, 2021, 13 pages.

"Appeal Decision", European Application No. 10194359.5, dated May 28, 2019, 20 pages.

"Final Office Action", U.S. Appl. No. 15/974,502, dated Jun. 4, 2020, 13 Pages.

"Foreign Office Action", Taiwanese Application No. 107107978, dated Jan. 15, 2019, 9 pages.

"Foreign Office Action", Taiwanese Application No. 107107979, dated Oct. 16, 2018, 9 pages.

"Foreign Office Action", Taiwanese Application No. 107115694, dated Dec. 21, 2018, 6 pages.

"Foreign Office Action", Taiwanese Application No. 107107729, dated Feb. 18, 2019, 7 pages.

"Foreign Office Action", Taiwanese Application No. 107107979, dated Apr. 12, 2019, 3 pages.

"Foreign Office Action", Chinese Application No. 201880007506.1, dated Apr. 2, 2020, 11 pages.

"Galaxy S4 Air Gesture", Galaxy S4 Guides, retrieved from: https://allaboutgalaxys4.com/galaxy-s4-features-explained/air-gesture/ on Sep. 3, 2019, 4 pages.

"International Preliminary Report on Patentability", PCT Application No. PCT/US2018/031862, dated Nov. 21, 2019, 12 pages.

"International Preliminary Report on Patentability", PCT Application No. PCT/US2018/025495, dated Dec. 12, 2019, 8 pages.

"International Preliminary Report on Patentability", PCT Application No. PCT/US2018/025506, dated May 15, 2019, 15 pages.

"International Preliminary Report on Patentability", PCT Application No. PCT/US2018/025489, dated Aug. 30, 2019, 18 pages.

"International Search Report", Application No. PCT/US2018/025506, dated Jul. 18, 2018, 4 pages.

"International Search Report", PCT Application No. PCT/US2018/025489, dated Jul. 18, 2018, 4 pages.

"International Search Report and Written Opinion", PCT Application No. PCT/US2019/033116, dated Jan. 29, 2020, 13 pages.

"International Search Report and Written Opinion", PCT Application No. PCT/US2019/037529, dated Mar. 24, 2020, 14 pages.

"International Search Report and Written Opinion", PCT Application No. PCT/US2018/025495, dated Jun. 28, 2018, 14 pages.

"International Search Report and Written Opinion", PCT Application No. PCT/US2018/031862, dated Jul. 26, 2018, 13 pages.

"Non-Final Office Action", U.S. Appl. No. 15/928,386, dated Jan. 7, 2020, 14 Pages.

"Non-Final Office Action", U.S. Appl. No. 15/928,346, dated Jan. 10, 2020, 11 Pages.

"Non-Final Office Action", U.S. Appl. No. 15/928,273, dated Feb. 18, 2020, 11 Pages.

"Non-Final Office Action", U.S. Appl. No. 15/974,502, dated Feb. 18, 2020, 11 Pages.

"Non-Final Office Action", U.S. Appl. No. 15/974,528, dated Feb. 18, 2020, 11 Pages.

(56) References Cited

OTHER PUBLICATIONS

"Notice of Allowance", U.S. Appl. No. 15/928,386, dated Apr. 21, 2020, 7 Pages.
"Notice of Allowance", U.S. Appl. No. 15/928,346, dated May 18, 2020, 8 Pages.
"Samsung Galaxy S4 Air Gestures", Video retrieved from https://www.youtube.com/watch?v=375Hb87yGcg, May 7, 2013, 4 pages.
"Written Opinion", PCT Application No. PCT/US2018/025489, dated Jul. 18, 2018, 8 pages.
"Written Opinion", PCT Application No. PCT/US2018/025506, dated Jul. 18, 2018, 8 pages.
"Written Opinion of the International Preliminary Examining Authority", PCT Application No. PCT/US2018/025489, dated May 10, 2019, 7 pages.
Chen, et al., "Indoor Target Tracking Using High Doppler Resolution Passive Wi-Fi Radar", 2015 IEEE International Conference on Acoustics, Speech and Signal Processing (ICASSP), Apr. 1, 2015 (Apr. 1, 2015), pp. 5565-5569, XP055311663, DOI: 10.1109/ICASSP.2015.7179036 ISBN: 978-1-4673-6997-8, Apr. 1, 2015, 5 pages.
Fan, et al., "Hand Gesture Recognition Based on Wi-Fi Chipsets", 2017 IEEE Radio and Wireless Symposium (RWS), Jan. 15, 2017 IEEE, pp. 98-100., 2017, 3 pages.
Lin, et al., "Study of Sub-6GHz Hybrid Beamforming Technology", ICT Journal No. 168, Dec. 29, 2016, 7 pages.
Tenglong, et al., "Hand Gesture Recognition Based on Wi-Fi Chipsets", 2017 IEEE Radio and Wireless Symposium , ( RWS). IEEE, pp. 98-100, XP033080528, DOI: 10.1109/RWS.2017.7885956, Jan. 15, 2017, 3 pages.
"Final Office Action", U.S. Appl. No. 16/903,349, dated Apr. 9, 2021, 15 pages.
"Corrected Notice of Allowance", U.S. Appl. No. 15/974,502, dated Sep. 30, 2020, 2 pages.
"Extended European Search Report", EP Application No. 20170421.0, dated Jun. 9, 2020, 7 pages.
"Final Office Action", U.S. Appl. No. 15/974,528, dated Jun. 5, 2020, 12 Pages.
"Notice of Allowance", U.S. Appl. No. 15/928,273, dated Jul. 15, 2020, 7 Pages.
"Notice of Allowance", U.S. Appl. No. 15/974,502, dated Aug. 12, 2020, 7 Pages.
"Notice of Allowance", U.S. Appl. No. 15/974,528, dated Aug. 27, 2020, 7 Pages.
"Foreign Office Action", IN Application No. 202147042091, dated Mar. 24, 2022, 7 pages.
"Foreign Office Action", CN Application No. 201980094660.1, dated Apr. 20, 2022, 24 pages.
"Foreign Office Action", JP Application No. 2021-557064, dated Jun. 14, 2022, 12 pages.
"Foreign Office Action", EP Application No. 18727945.0, dated Jul. 4, 2022, 5 pages.
"Foreign Office Action", CN Application No. 201880019349.6, dated Sep. 9, 2022, 21 pages.
"Foreign Office Action", EP Application No. 19735072.1, dated Oct. 25, 2022, 4 pages.

\* cited by examiner

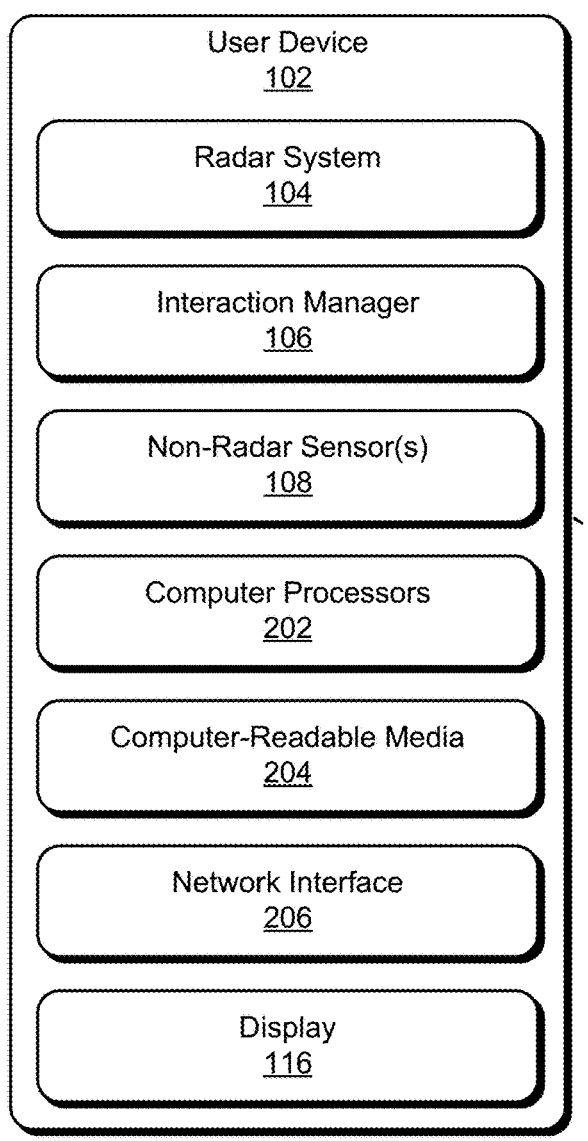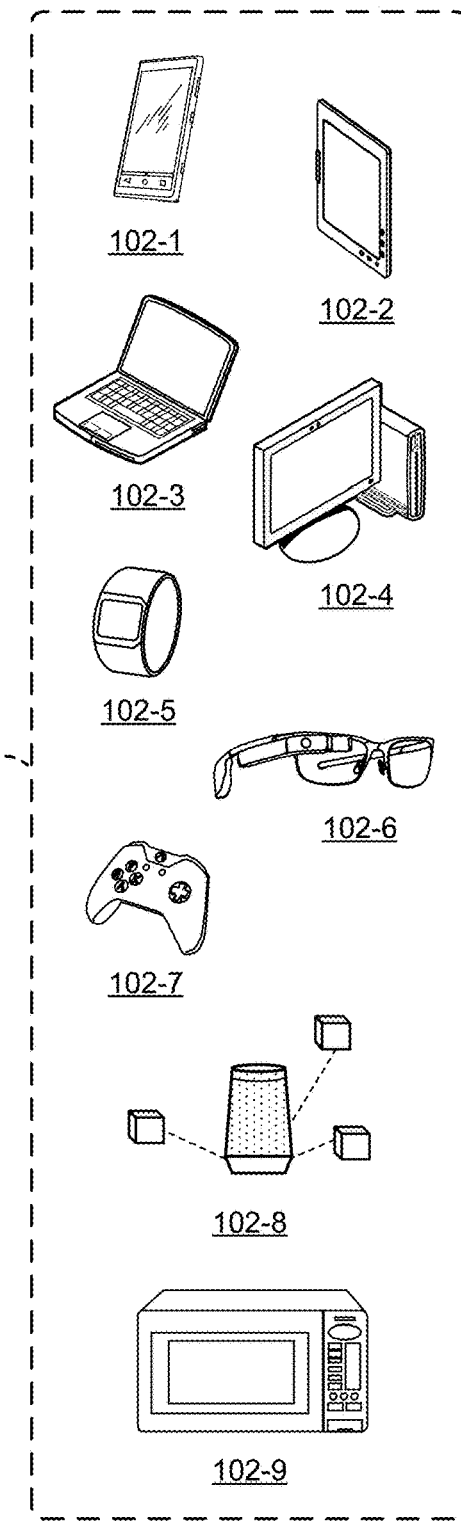
FIG. 2

MOBILE DEVICE-BASED RADAR SYSTEM FOR PROVIDING A MULTI-MODE INTERFACE

BACKGROUND

Mobile devices have become nearly essential for both business and personal life. The applications on mobile devices and other electronic devices provide an ever-increasing variety of productivity, entertainment, and communication features with which users regularly interact. These devices are many peoples' constant companions at work, play, and home. Users communicate with them via voice and touch, and treat them like a virtual assistant to schedule meetings and events, consume digital media, and share presentations and documents. In the everyday world, though, communication is more than just the words people use. A large part of how people communicate, and express their intention to communicate, is based on how they perceive and manage their interpersonal space. People often use changes of spatial relationships (such as interpersonal distance or orientation) as an implicit form of communication. For instance, people maintain certain distances from others depending on familiarity, orient toward others when addressing them, move closer to objects they are interested in, and stand or sit relative to others depending on the task at hand.

With the aid of machine-learning techniques, mobile device applications and the mobile devices themselves become more familiar with users' routines and preferences and can provide restaurant recommendations, suggest movies, and otherwise independently communicate. For all this computing power and artificial intelligence, however, mobile devices are still reactive communicators. That is, however "smart" a smartphone is, and however much users talk to them like they are people, the mobile device is still dependent on being activated. To activate the mobile device, the user typically has to first engage the mobile device to make it aware of the user's intention to use the mobile device. After doing so, the mobile device makes available applications and functionality for the user's use. Consequently, the user experience provided by the mobile device prior to the user explicitly engaging the mobile device is dull, somewhat blank, and lacking in richness.

SUMMARY

This document describes techniques and systems that enable a mobile device-based radar system for providing a multi-mode interface. The techniques and systems use a radar field to enable a mobile device to accurately determine the presence or absence of a user and further determine movements of the user to implicitly interact, or communicate, with the mobile device. Using these techniques, the mobile device can account for the user's nonverbal communication cues to determine and maintain an awareness of the user in its environment, and respond to indirect interactions by the user to educate the user that the mobile device is aware of the user and the user's movements with respect to the mobile device. The response can be provided using visual feedback displayed via the multi-mode interface based on the user's movement or position relative to the user device. The multi-mode interface is described as "ambient" because it operates and is provided as part of the mobile device's digital environment (e.g., the multi-mode interface may be considered as a "canvas" for the operating system of the mobile device), separate and independent of an application program executed by the mobile device.

Aspects described below include a user device comprising a radar system, one or more computer processors, and one or more computer-readable media. The radar system is implemented at least partially in hardware and provides a radar field. The radar system also senses reflections from a user in the radar field, analyzes the reflections from the user the radar field, and provides radar data based on the analysis of the reflections. The one or more computer-readable media include stored instructions that can be executed by the one or more computer processors to implement a radar-based interaction manager. The radar-based interaction manager provides a multi-mode interface having at least a first mode and a second mode. The multi-mode interface provides a black display or a low-luminosity display during the first mode. The radar-based interaction manager also detects, based on the radar data and during the first mode, a presence of the user or threshold movement by the user in relation to the user device. In response to detection of the presence of the user or threshold movement of the user, the radar-based interaction manager changes the multi-mode interface from the first mode to the second mode. In response to the change to the second mode, the radar-based interaction manager causes the multi-mode interface to provide visual feedback corresponding to the presence of the user or threshold movement of the user by altering one or more display parameters of the black display or the low-luminosity version of the low-luminosity display.

Aspects described below also include a method implemented in a user device. The method comprises providing a multi-mode interface having at least a first mode and a second mode, the multi-mode interface providing a black display or a low-luminosity display during the first mode. The method also includes obtaining radar data from a radar system when the user device is in a locked state, the radar data representing reflections from a user in a radar field generated by the radar system. The method additionally includes detecting, based on the radar data and during the first mode, an presence of the user or threshold movement by the user in relation to the user device. Further, the method includes, responsive to detection of the presence of the user or threshold movement by the user, cause the multi-mode interface to change from the first mode to the second mode. In addition, the method includes, responsive to the change to the second mode, causing the multi-mode interface to provide visual feedback corresponding to the presence of the user or threshold movement by the user by altering one or more display parameters of the black display or the low-luminosity display.

Aspects described below also include a method implemented in a user device that includes a radar system. The method includes the radar system providing a radar field, sending reflections from a user in the radar field, analyzing the reflections from the user in the radar field, and providing radar data based on the analysis of the reflections. The method also includes providing, by a radar-based interaction manager, a multi-mode interface having at least a first mode and a second mode. In aspects, the multi-mode interface provides a black display, a low-luminosity display, a monochrome display, or a high-luminosity and color saturation display during the first mode. The method further includes detecting, by the radar-based interaction manager based on the radar data and during the first mode, a presence of the user or threshold movement of the user in relation to the user device. The method additionally comprises, responsive to detection of the presence of the user or threshold movement of by the user, changing, by the radar-based interaction manager, the multi-mode interface from the first mode to the second mode. Also, the method includes, responsive to changing the multi-mode interface to the second mode, providing visual feedback corresponding to the implicit interaction by altering one or more display parameters of the black display, the low-luminosity display, the monochrome display, or the high-luminosity and color saturation display.

This summary is provided to introduce simplified concepts concerning a mobile device-based radar system for providing a multi-mode interface, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a mobile device-based radar system for providing a multi-mode interface are described in this document with reference to the following drawings. The same numbers are used throughout the drawings to reference like features and components:

FIG. 2 illustrates an example implementation of the mobile device of FIG. 1 that includes a radar system and can implement the multi-mode interface.

DETAILED DESCRIPTION

Overview

Figure 1:
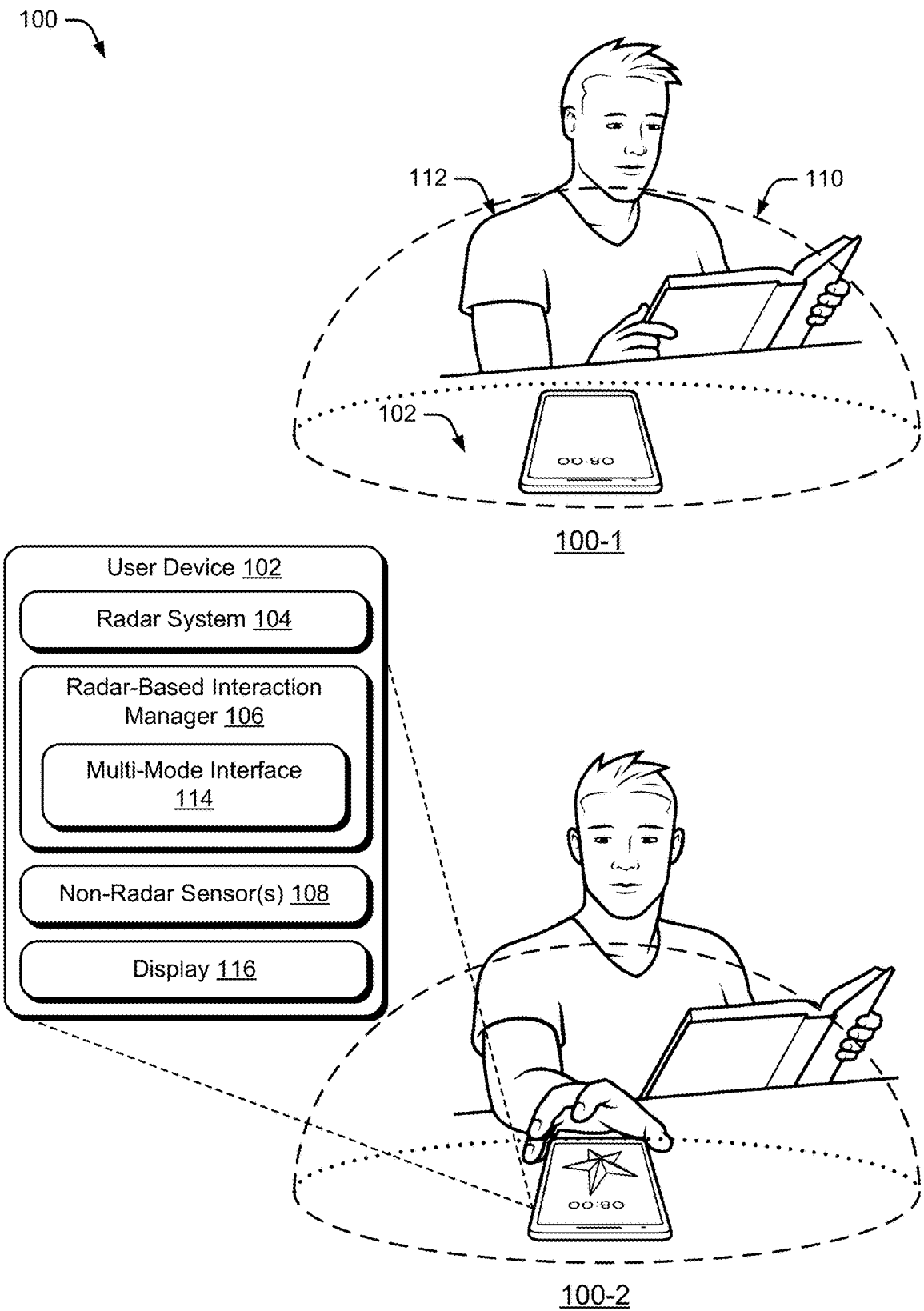
FIG. 1 illustrates an example environment in which techniques enabling a mobile device-based radar system for providing a multi-mode interface can be implemented.

This document describes techniques and systems that enable a mobile device-based radar system for providing a multi-mode interface. In particular, the mobile device-based radar system provides visual feedback, using the multi-mode interface, in response to implicit interactions by the user with the mobile device. Implicit interactions, or communications, include a user's presence, spatial relations, and hand movements around the mobile device. In particular, the implicit interactions by the user with the mobile device are movements of the user near the mobile device that are not intended to initiate or perform a function on the device. Accordingly, implicit interactions are not considered explicit or direct user input but are instead actions by the user that indirectly provide input to the mobile device. Put another way, implicit interactions include user actions near the mobile device that are not intended to provide direct input but which the mobile device can use to determine, or interpret as, an implied or indirect input. Example implicit interactions include a user entering an area (e.g., radar field) having a specified radius around the mobile device, a user's hand reaching toward (or away from) the mobile device within a specified threshold distance, a user looking toward the mobile device, a user moving his head toward the mobile device within a specified distance such as to look more closely at the mobile device, a user nodding or shaking his head while facing the mobile device, a user exiting the radar field, and so forth. In contrast to implicit interactions, explicit user inputs may include touch input to a touchscreen of the mobile device, actuation of a button on the mobile device, or a gesture such as a swipe, tap, double tap, wave over the mobile device, etc. that directly interacts with the mobile device, or an application program or user-interface (UI) element of the mobile device, in a way that is intended by the user to initiate a particular function.

The described techniques and systems employ a radar system to provide a rich ambient multi-mode interface experience that changes modes based on a user's implicit interactions with the mobile device, rather than reacting only to explicit user input, to provide feedback to the user to indicate that the device is aware of and is detecting the user's movements and can react in interesting ways. The user's implicit interaction may be discerned by determining an unauthenticated user's movements relative to the device (e.g., when the device is in a locked state).

The multi-mode interface includes several modes including, for example, a dormant mode, an ambient mode, an alert mode, and an active mode. Varying levels of power are provided to a display device of the mobile device based on which mode of the multi-mode interface is currently being executed.

In an example, when the radar system is in a lower-power mode, the mobile device can also be in a lower-power state by turning off or otherwise reducing the power consumption of various functions such as a display device, a touchscreen, a microphone, a voice assistant, and so forth. At the same time, the multi-mode interface may be in the dormant mode, such that the interface is in a dormant state and provides a power-off display, e.g., a black display. In some cases, the display device is considered to be in an "OFF" state when the multi-mode interface is in the dormant mode such that the display device is turned off and no power is provided to the display device to illuminate pixels. The dormant mode may be applied to the multi-mode interface when the user is not near the mobile device (e.g., user is not detected within a specified distance of the mobile device) or when the mobile device is placed in the user's pocket, purse, or bag where the device detects that it is within a dark location and the user is not interacting (implicitly or explicitly) with the mobile device.

When the radar system detects the user in the area, the interaction manager autonomously transitions the multi-mode interface from the dormant mode to the ambient mode. In the ambient mode, the mobile device detects the user's presence within a specified distance of the device (e.g., within a radar field of the radar system). Here, the device operates in the lower-power state and the display screen is set to a low luminosity to minimize power consumption. As described herein, luminosity refers to the perceived brightness of an object by a human. Modifying the luminosity may include modifying luminance (e.g., brightness), contrast, and/or opaqueness. A low-luminosity may refer to a luminosity level that is less than a predefined threshold level defined relative to a maximum luminosity (e.g., 100% luminosity). Example predefined threshold levels for low-luminosity may include approximately 50%, 40%, 25%, 15%, and so on, of the maximum luminosity. This predefined threshold may be set by a manufacturer or defined by a setting selected by the user. A high-luminosity may refer to a luminosity level that is greater than or equal to a predefined threshold level defined relative to the maximum luminosity. Examples of predefined threshold levels for high-luminosity may include approximately 50%, 60%, 75%, 85%, 95%, or 100% of the maximum luminosity. Any suitable number of luminosity levels can be implemented, such as three (e.g., low, medium, high), four, five, or more, to correlate with the number of modes of the multi-mode interface.

In some cases, one or more user-interface elements (e.g., a clock, a battery-charge level indicator, a home button, a lock button, etc.) are displayed on the display screen with low luminosity, such as low brightness. The display screen can also display an image with low luminosity and color saturation, such as a faded and/or dim, monochrome (e.g., greyscale) version of the image. Low-color saturation is not, however, limited to monochrome. Rather, the low-color saturation may include one or more colors with darkened tones or shades such that the perceived colorfulness of the display is muted.

In one aspect, when transitioning from the dormant mode to the ambient mode, the display screen lights up with high luminosity to provide visual feedback by revealing (e.g., fading in) the image for a specified duration of time to greet the user. In this way, the display informs the user that the device has detected the user's presence and is prepared to respond to the user's movements. After the duration of time expires, the luminosity may decrease such that the image fades into a less prominent state. For example, the display screen may be darkened to hide the image or provide a low-luminosity, low-color saturation (or desaturated) version of the image so as to reduce power consumption. In some implementations, one or more of the user-interface elements may also be darkened and/or desaturated to reduce power consumption. When the multi-mode interface is in the ambient mode, the radar system may use a low sample rate for detecting the user's movements, causing the multi-mode interface to be intermittently responsive to the user's movements. A low sample rate allows the mobile device to maintain low-power consumption.

The radar system can detect threshold movement by an object, such as the user's hand reaching toward the device, within a specified distance of the device (e.g., approximately 1.0 meters, 0.75 meters, 0.5 meters, 0.3 meters, etc.). When the radar system detects this threshold movement, the interaction manager can automatically transition the multi-mode interface from the ambient mode to the alert mode. In the alert mode, the device increases the luminosity of the display (or at least the image) as the user reaches toward the device. The luminosity can be adjusted in proportion to an amount and/or rate of decrease in the distance between the user's hand and the device such that at least the image progressively becomes more visible as the user's hand approaches the device. In some instances, one or more shapes or objects may fade-in to view and/or move (e.g., shift, rotate two-dimensionally and/or three-dimensionally, stretch, reshape, reposition) as the user's hand approaches the device. Another example includes shapes or objects moving in from the sides of the display device, progressively growing in size and/or becoming more visible as the user's hand approaches the device. In aspects, the shapes or objects may move onscreen as the user's hand moves toward the device, such as toward or away from the user's hand, or toward or away from a specified onscreen-location. Another example includes the display transitioning from a black display or low-luminosity display, with one or more UI elements displayed in a light color (e.g., white, yellow, orange, etc.), to high-luminosity with the one or more UI elements displayed in a dark color (e.g., black, brown, navy blue, etc.).

When an authentication system (e.g., radar-based authentication, facial recognition authentication, fingerprint recognition authentication, voice-recognition authentication, and so forth) of the mobile device recognizes the user as an authorized user, the interaction manager transitions the multi-mode interface to the active mode. The active mode is a fully-operational state of the device and provides full rights to an authenticated user. This is in contrast to the dormant, ambient, and alert modes, which each provide less-than-full rights to the user and are executed during a locked state of the mobile device. In the active mode, the device operates in a higher-power state in which the user has full access to the device. In addition, the active mode provides a high-luminosity and color saturation display. When transitioning to the active mode (e.g., when the device unlocks based on user recognition and authentication), the device increases the color saturation of the display. In this way, color flows into the image to provide visual feedback to the user to indicate that the user is recognized and authenticated and the device is unlocked. In some aspects, the luminosity can be further increased along with the increase in color saturation until reaching an appropriate level of luminosity, such as a preset luminosity level associated with operation of the device in an unlocked state.

Some conventional mobile devices may use cameras or proximity sensors (e.g., capacitive sensors) to determine the location of the user and adjust various functions of the mobile device based on the proximity of the user. For example, the mobile device may provide additional privacy or aesthetic value by turning off a display unless the user is within a predetermined distance. The conventional mobile device, however, typically cannot provide a rich ambient experience to a user that can educate the user that the device can detect the user's movements and can react in interesting ways, particularly when the user device is in a locked state.

Further, power consumption of the radar system and the mobile device itself (or at least the display device of the mobile device) can be substantially less than some conventional techniques, which may use an always-on camera (or other sensors or combinations of sensors) to control some display features, at least because power consumption of the display and the radar system is reduced when the user is not near the mobile device and is gradually increased based on the user's level of interaction with the mobile device. These are but a few examples of how the described techniques and devices may be used to enable a mobile device-based radar system for providing a multi-mode interface. Other examples and implementations of which are described throughout this document. The document now turns to an example operating environment, after which example devices, methods, and systems are described.

Operating Environment

FIG. 1 illustrates an example environment 100 in which techniques enabling a mobile device-based radar system for providing a multi-mode interface can be implemented. The example environment 100 includes a user device 102 (e.g., electronic device), which includes, or is associated with, a radar system 104, a persistent radar-based interaction manager 106 (interaction manager 106), and, optionally, one or more non-radar sensors 108 (non-radar sensor 108). The non-radar sensor 108 can be any of a variety of devices, such as an audio sensor (e.g., a microphone), a touch-input sensor (e.g., a touchscreen), or an image-capture device (e.g., a camera or video-camera).

In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar system 104 also enables the user device 102, or another electronic device, to sense and analyze reflections from an object (e.g., user 112) in the radar field 110. Some implementations of the radar system 104 are particularly advantageous as applied in the context of smartphones, such as the user device 102, for which there is a convergence of issues such as a need for low power, a need for processing efficiency, limitations in a spacing and layout of antenna elements, and other issues, and are even further advantageous in the particular context of smartphones for which radar detection of fine hand gestures is desired. Although the embodiments are particularly advantageous in the described context of the smartphone for which fine radar-detected hand gestures are required, it is to be appreciated that the applicability of the features and advantages of the present invention is not necessarily so limited, and other embodiments involving other types of electronic devices may also be within the scope of the present teachings.

The object may be any of a variety of objects from which the radar system 104 can sense and analyze radar reflections, such as wood, plastic, metal, fabric, a human body, or human body parts (e.g., a foot, hand, or finger of a user of the user device 102). As shown in FIG. 1, the object is a user (e.g., user 112) of the user device 102. Based on the analysis of the reflections, the radar system 104 can provide radar data that includes various types of information associated with the radar field 110 and the reflections from the user 112, as described with reference to FIGS. 3-6 (e.g., the radar system 104 can pass the radar data to other entities, such as the interaction manager 106).

It should be noted that the radar data may be continuously or periodically provided over time, based on the sensed and analyzed reflections from the user 112 in the radar field 110. A position of the user 112 can change over time (e.g., the user 112 may move within the radar field 110) and the radar data can thus vary over time corresponding to the changed positions, reflections, and analyses. Because the radar data may vary over time, the radar system 104 may provide radar data that includes one or more subsets of radar data that correspond to different periods of time. For example, the radar system 104 may provide a first subset of the radar data corresponding to a first time-period, a second subset of the radar data corresponding to a second time-period, and so forth.

The interaction manager 106 can be used to interact with or control various components of the user device 102 (e.g., modules, managers, systems, or interfaces). For instance, the interaction manager 106 can interact with, or implement, a multi-mode interface 114. The interaction manager 106 can maintain the multi-mode interface 114 in a particular mode or cause the multi-mode interface 114 to change modes, based on radar data obtained from the radar system 104. These modes are described in further detail below with respect to FIGS. 7-9.

The user device 102 can also include a display device, such as display 116. The display 116 can include any suitable display device, such as a touchscreen, a liquid crystal display (LCD), thin film transistor (TFT) LCD, an in-place switching (IPS) LCD, a capacitive touchscreen display, an organic light emitting diode (OLED) display, an active-matrix organic light-emitting diode (AMOLED) display, super AMOLED display, and so forth. The display 116 is used to display the multi-mode interface 114 in any of its various modes.

The radar-based interaction manager 106 can determine movements made by the user or the user's hand based on radar data provided by the radar system 104. The interaction manager 106 then processes the movements in a way that enables the user to implicitly interact with the user device 102 via the movements. For example, as described with reference to FIGS. 3-6, the radar system can use the radar field to sense and analyze reflections from objects in the radar field in ways that enable high resolution and accuracy for movement recognition of the user.

In more detail, consider FIG. 2, which illustrates an example implementation 200 of the user device 102 (including the radar system 104, the interaction manager 106, and the non-radar sensor 108) that can implement a mobile device-based radar system for providing a multi-mode interface. The user device 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a microwave 102-9. The user device 102 can also include other devices, such as televisions, entertainment systems, audio systems, automobiles, drones, track pads, drawing pads, netbooks, e-readers, home security systems, and other home appliances. Note that the user device 102 can be wearable, non-wearable but mobile, or relatively immobile (e.g., desktops and appliances).

It should be noted that exemplary overall lateral dimensions of the user device 102 can be, for example, approximately eight centimeters by approximately fifteen centimeters. Exemplary footprints of the radar system 104 can be even more limited, such as approximately four millimeters by six millimeters with antennas included. The requirement of such a limited footprint for the radar system 104, which is needed to accommodate the many other desirable features of the user device 102 in such a space-limited package (e.g., a fingerprint sensor, the non-radar sensor 108, and so forth) combined with power and processing limitations, can lead to compromises in the accuracy and efficacy of radar gesture detection, at least some of which can be overcome in view of the teachings herein.

The user device 102 also includes one or more computer processors 202 and one or more computer-readable media 204, which includes memory media and storage media.

Applications and/or an operating system (not shown) implemented as computer-readable instructions on the computer-readable media 204 can be executed by the computer processors 202 to provide some or all of the functionalities described herein. The user device 102 may also include a network interface 206. The user device 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 operates as a monostatic radar by transmitting and receiving its own radar signals. In some implementations, the radar system 104 may also cooperate with other radar systems 104 that are within an external environment to implement a bistatic radar, a multistatic radar, or a network radar. Constraints or limitations of the user device 102, however, may impact a design of the radar system 104. The user device 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 2, the radar system 104 and the interaction manager 106 are illustrated as part of the user device 102. In other implementations, either or both of the radar system 104 and the interaction manager 106 may be separate or remote from the user device 102.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 15 illustrate some of many possible environments and devices capable of employing the described techniques. FIGS. 3-6 describe additional details and features of the radar system 104. In FIGS. 3-6, the radar system 104 is described in the context of the user device 102, but as noted above, the applicability of the features and advantages of the described systems and techniques are not necessarily so limited, and other embodiments involving other types of electronic devices may also be within the scope of the present teachings.

Figure 3:
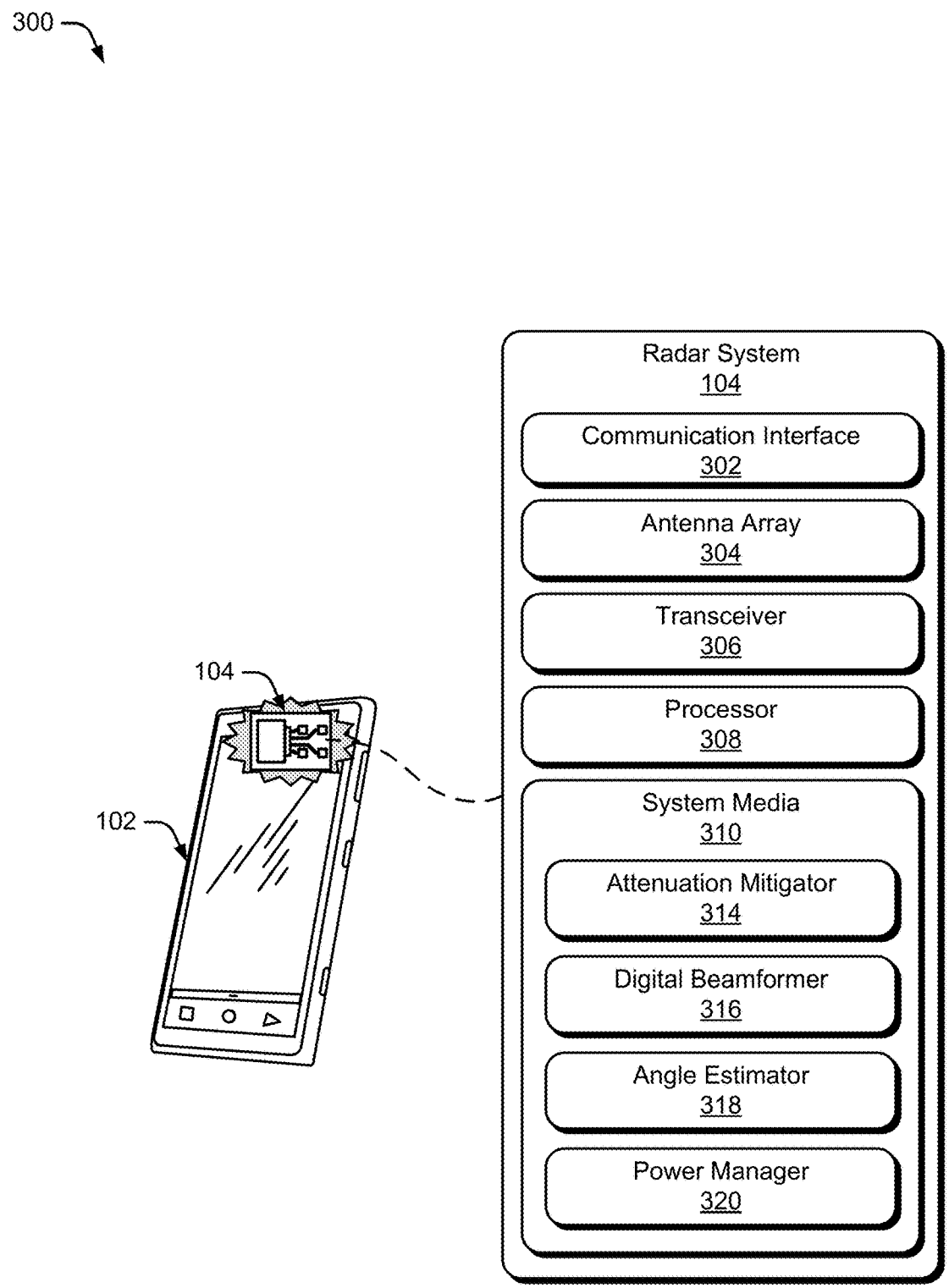
FIG. 3 illustrates an example implementation of the radar system of FIG. 2.

FIG. 3 illustrates an example implementation 300 of the radar system 104 that can be used to enable a mobile device-based radar system for providing a multi-mode interface. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the user device 102) or some combination thereof. The system media 310, which may be included within, or be separate from, the computer-readable media 204 of the user device 102, includes one or more of the following modules: an attenuation mitigator 314, a digital beamformer 316, an angle estimator 318, or a power manager 320. These modules can compensate for, or mitigate the effects of, integrating the radar system 104 within the user device 102, thereby enabling the radar system 104 to recognize small or complex gestures, distinguish between different orientations of the user, continuously monitor an external environment, or realize a target false-alarm rate. With these features, the radar system 104 can be implemented within a variety of different devices, such as the devices illustrated in FIG. 2.

Using the communication interface 302, the radar system 104 can provide radar data to the interaction manager 106. The communication interface 302 may be a wireless or wired interface based on the radar system 104 being implemented separate from, or integrated within, the user device 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the interaction manager 106 for a mobile device-based radar system for providing a multi-mode interface.

Figure 4:
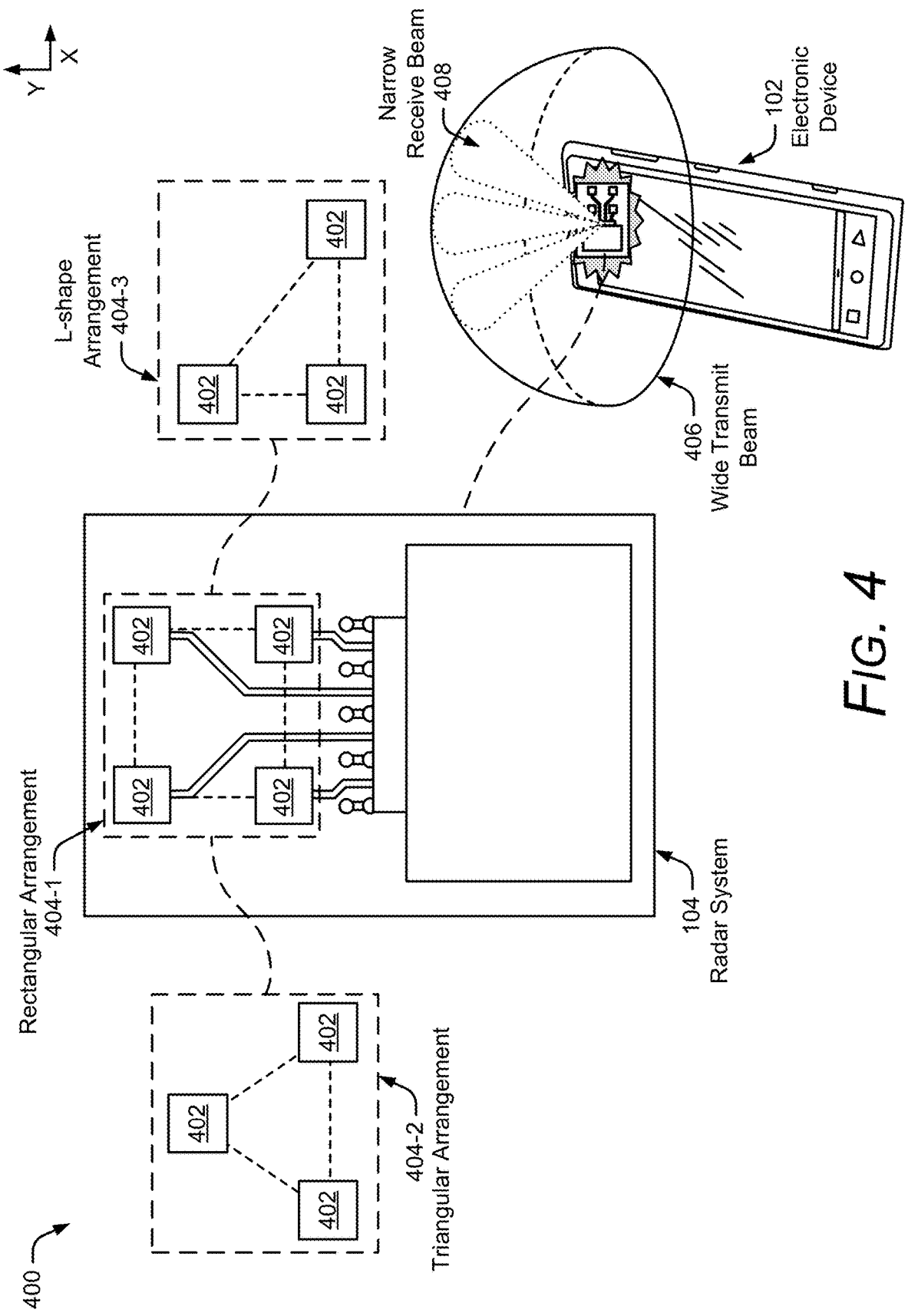
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the user device 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

A power manager 320 enables the radar system 104 to conserve power internally or externally within the user device 102. In some implementations, the power manager 320 communicates with the interaction manager 106 to conserve power within either or both of the radar system 104 or the user device 102. Internally, for example, the power manager 320 can cause the radar system 104 to collect data using a predefined power mode or a specific duty cycle. In this case, the power manager 320 dynamically switches between different power modes such that response delay and power consumption are managed together based on the activity within the environment. In general, the power manager 320 determines when and how power can be conserved, and incrementally adjusts power consumption to enable the radar system 104 to operate within power limitations of the user device 102. In some cases, the power manager 320 may monitor an amount of available power remaining and adjust operations of the radar system 104 accordingly. For example, if the remaining amount of power is low, the power manager 320 may continue operating in a lower-power mode instead of switching to a higher-power mode.

The lower-power mode, for example, may use a lower duty cycle on the order of a few hertz (e.g., approximately 1 Hz or less than 5 Hz), which reduces power consumption to a few milliwatts (mW) (e.g., between approximately 2 mW and 8 mW). The higher-power mode, on the other hand, may use a higher duty cycle on the order of tens of hertz (Hz) (e.g., approximately 20 Hz or greater than 10 Hz), which causes the radar system 104 to consume power on the order of several milliwatts (e.g., between approximately 6 mW and 20 mW). While the lower-power mode can be used to monitor the external environment or detect an approaching user, the power manager 320 may switch to the higher-power mode if the radar system 104 determines the user is starting to perform a gesture. Different triggers may cause the power manager 320 to switch between the different power modes. Example triggers include motion or the lack of motion, appearance or disappearance of the user, the user moving into or out of a designated region (e.g., a region defined by range, azimuth, or elevation), a change in velocity of a motion associated with the user, or a change in reflected signal strength (e.g., due to changes in radar cross section). In general, the triggers that indicate a lower probability of the user interacting with the user device 102 or a preference to collect data using a longer response delay may cause a lower-power mode to be activated to conserve power.

The power manager 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (μs), milliseconds (ms), or seconds (s). Further, the power manager 320 can modify transmission power of the radar signals by adjusting an amount of amplification provided by a signal amplifier. Additionally, the power manager 320 can control the use of different hardware components within the radar system 104 to conserve power. If the processor 308 comprises a lower-power processor and a higher-power processor (e.g., processors with different amounts of memory and computational capability), for example, the power manager 320 can switch between utilizing the lower-power processor for low-level analysis (e.g., implementing the idle mode, detecting motion, determining a location of a user, or monitoring the environment) and the higher-power processor for situations in which high-fidelity or accurate radar data is requested by the interaction manager 106 (e.g., for implementing the attention mode or the interaction mode, gesture recognition or user orientation).

Further, the power manager 320 can determine a context of the environment around the user device 102. From that context, the power manager 320 can determine which power states are to be made available and how they are configured. For example, if the user device 102 is in a user's pocket, then although the user 112 is detected as being proximate to the user device 102, there is no need for the radar system 104 to operate in the higher-power mode with a high duty cycle. Accordingly, the power manager 320 can cause the radar system 104 to remain in the lower-power mode, even though the user is detected is detected as being proximate to the user device 102, and the display 116 to remain in an off state. The user device 102 can determine the context of its environment using any suitable non-radar sensor 108 (e.g., gyroscope, accelerometer, light sensor, proximity sensor, capacitance sensor, and so on) in combination with the radar system 104. The context may include time of day, calendar day, lightness/darkness, number of users near the user 112, surrounding noise level, speed of movement of surrounding objects (including the user 112) relative to the user device 102, and so forth).

Figure 5:
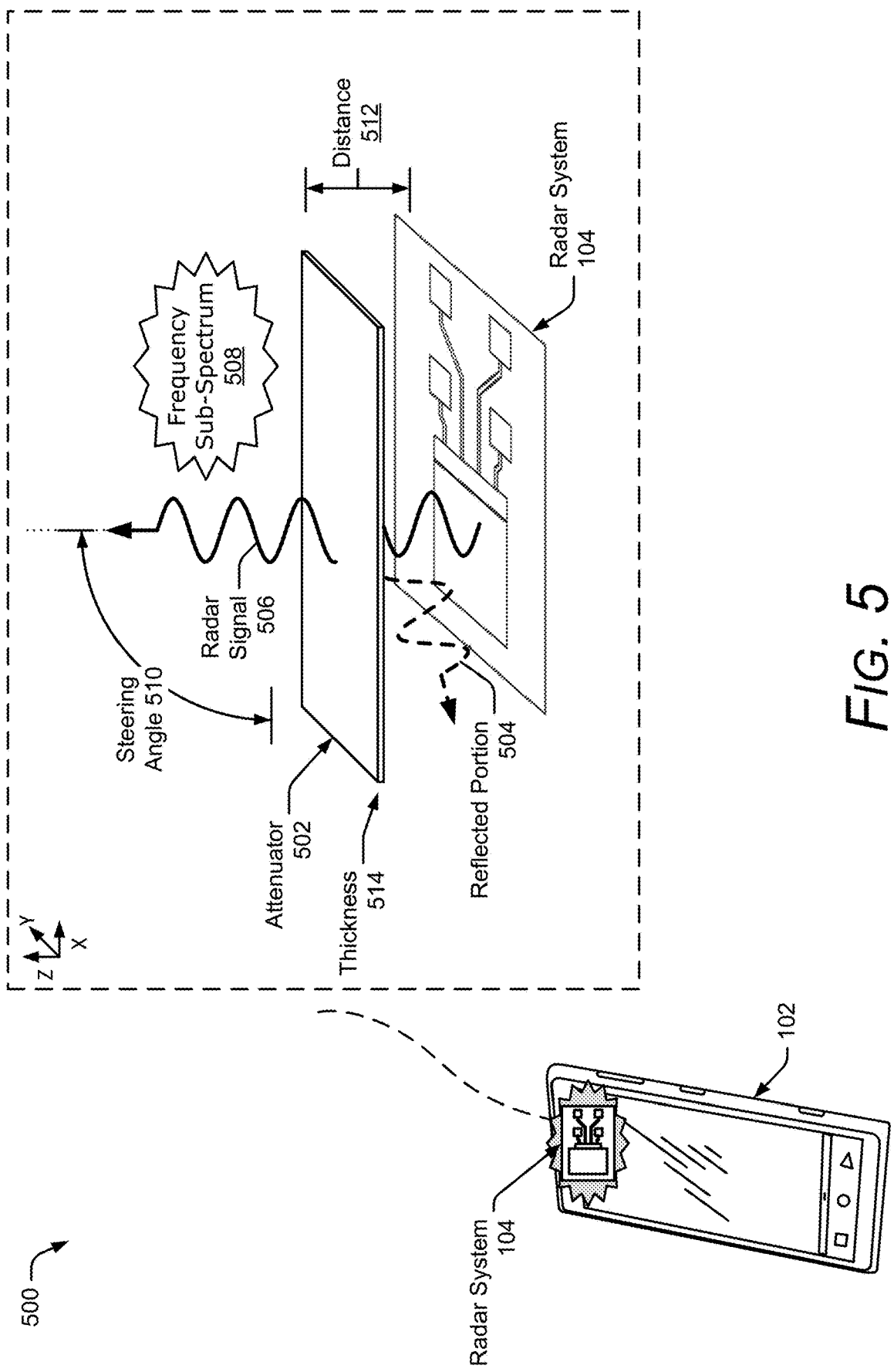
FIG. 5 illustrates additional details of an example implementation of the radar system of FIG. 2.

FIG. 5 illustrates additional details of an example implementation 500 of the radar system 104 within the user device 102. In the example 500, the antenna array 304 is positioned underneath an exterior housing of the user device 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the user device 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the user device 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
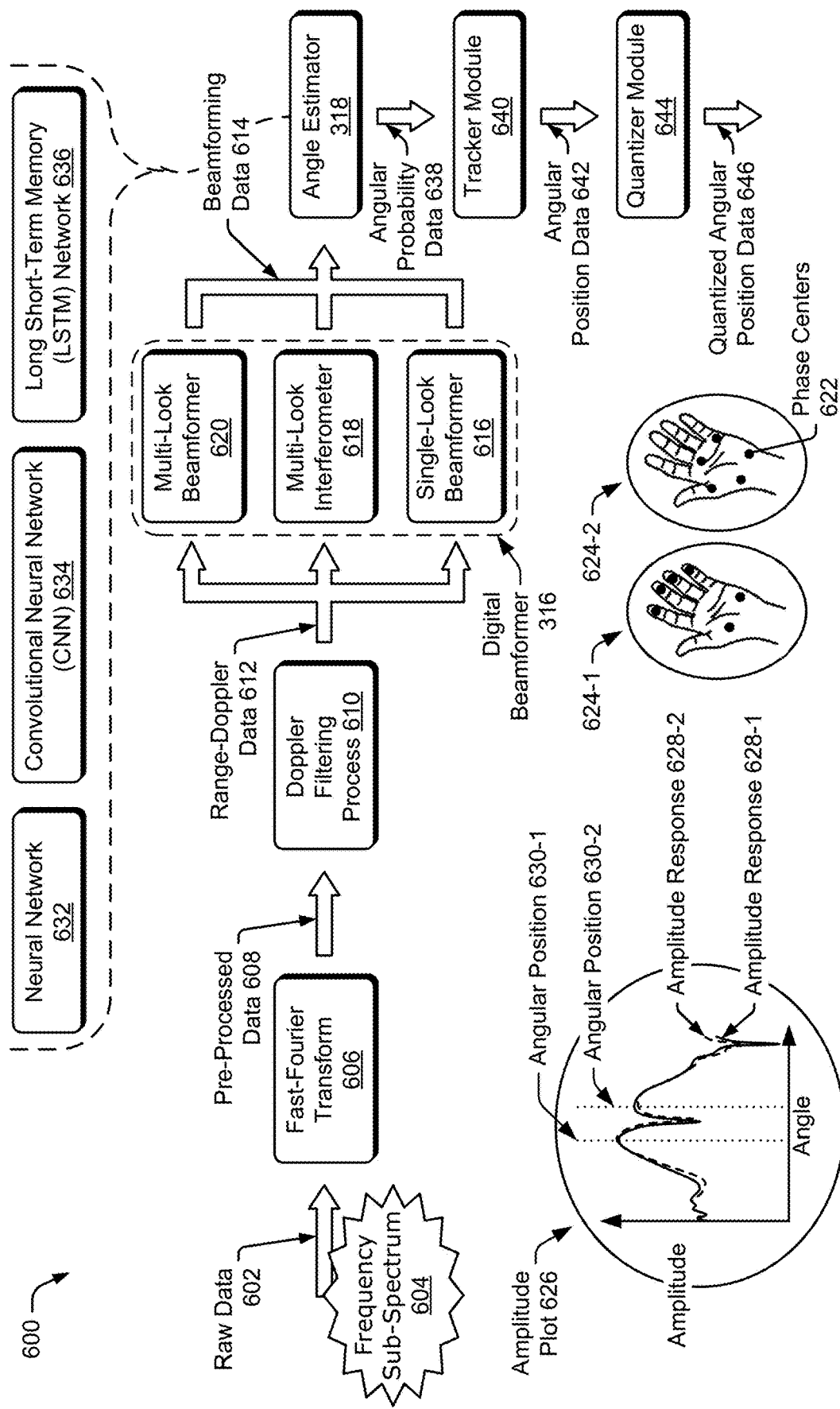
FIG. 6 illustrates an example scheme that can be implemented by the radar system of FIG. 2.

FIG. 6 illustrates an example scheme 600 implemented by the radar system 104. Portions of the scheme 600 may be performed by the processor 308, the computer processors 202, or other hardware circuitry. The scheme 600 can be customized to support different types of electronic devices and radar-based applications (e.g., the interaction manager 106), and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2. Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small gestures or distinguish between multiple portions of the user.

The angle estimator 318 analyzes the beamforming data 614 to estimate one or more angular positions. The angle estimator 318 may utilize signal processing techniques, pattern matching techniques, or machine learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted-line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to the target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of user device 102 (e.g., computational capability or power constraints) or a target angular resolution for the interaction manager 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the user device 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the interaction manager 106. In some situations, fewer quantization levels can be used such that the quantized angular position data 646 indicates whether the target is to the right or to the left of the user device 102 or identifies a 90-degree quadrant the target is located within. This may be sufficient for some radar-based applications, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications, such as gesture recognition, or in implementations of the attention mode or the interaction mode as described herein. In some implementations, the digital beamformer 316, the angle estimator 318, the tracker module 640, and the quantizer module 644 are together implemented in a single machine learning module.

These and other capabilities and configurations, as well as ways in which entities of FIG. 1-6 act and interact, are set forth below. The described entities may be further divided, combined, used along with other sensors or components, and so on. In this way, different implementations of the user device 102, with different configurations of the radar system 104 and non-radar sensors, can be used to implement a mobile device-based radar system for providing a multi-mode interface. The example operating environment 100 of FIG. 1 and the detailed illustrations of FIGS. 2-6 illustrate but some of many possible environments and devices capable of employing the described techniques.

Example Devices

Figure 7:
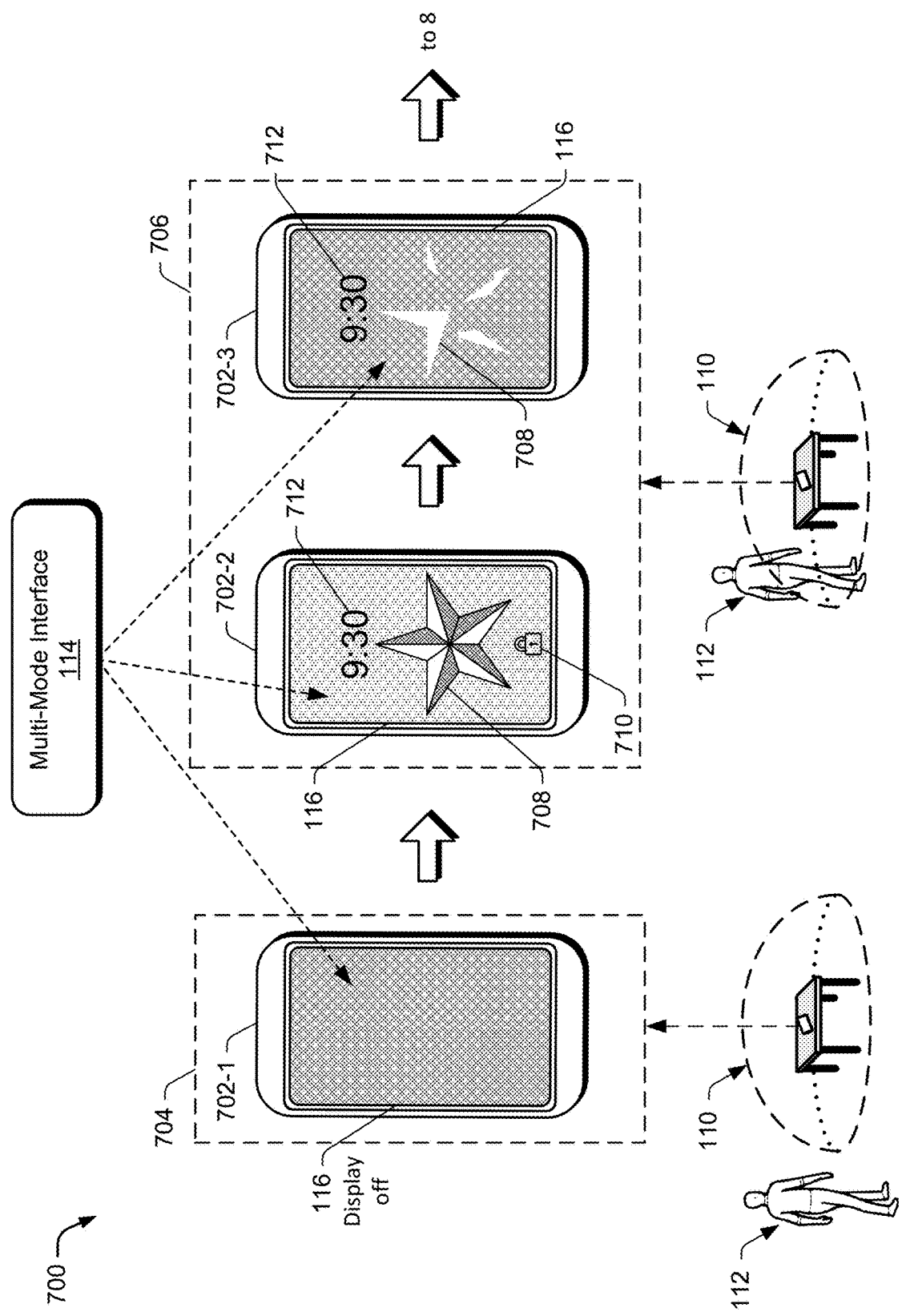
FIGS. 7 and 8 illustrate example implementations of a multi-mode interface that changes modes based on radar data indicating a user's implicit interactions with a mobile device.
Figure 8:
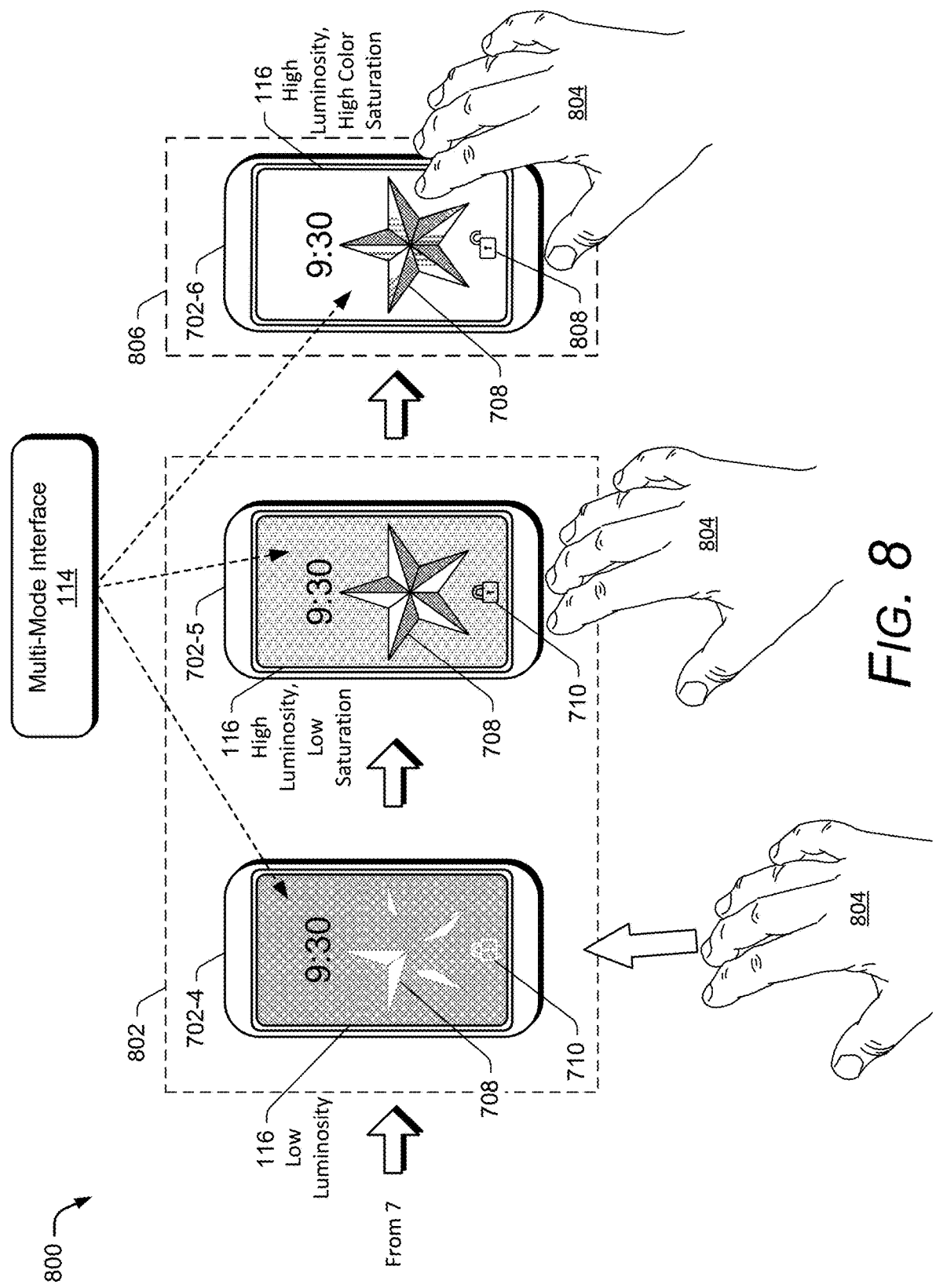

As noted, the techniques and systems described herein can also enable the user device 102 to provide functionality based on a user's implicit interactions with the device. FIGS. 7 and 8 illustrate example implementations 700 and 800 of a multi-mode interface that changes modes based on radar data indicating a user's implicit interactions with a mobile device. The example implementations 700 and 800 illustrate a user device 702 (e.g., the user device 102) in different instances 702-1, 702-2, 702-3, 702-4, 702-5, and 702-6. When the user 112 is not detected within the radar field 110, the multi-mode interface 114 operates in a dormant mode 704. In the dormant mode 704, the multi-mode interface 114 is dormant and provides a black display, such that no image(s) or object(s) are displayed via the display 116 of the user device 702-1. In addition, the display 116 may be in an off state or a low-power state and the radar system 104 from FIG. 1 may be in an idle mode. These modes and states are low-power operational modes and states.

When the user 112 enters the radar field 110, the radar system 104 detects the user 112 based on radar signals reflected off of the user 112. The interaction manager 106 uses this radar data to determine the presence of the user 112 within the radar field 110. In response to detecting the presence of the user 112, the interaction manager 106 causes the multi-mode interface 114 to change modes. In this instance, the multi-mode interface 114 exits the dormant mode 704 and enters an ambient mode 706. When the multi-mode interface 114 enters the ambient mode 706, default or predefined display parameters (e.g., luminosity, color saturation) may be applied for a short duration of time (e.g., 0.5 seconds, 1.0 second, 1.25 seconds, 1.5 seconds, 2.0 seconds, and so on) to "greet" the user. In FIG. 7, one or more objects and/or images, including an image 708 of a three-dimensional star and a lock icon 710 are presented with high luminosity for the duration of time. A background of the multi-mode interface 114 may also be provided at a default or predefined luminosity and color saturation. Other elements may also be included, such as a clock element 712 (showing time and/or calendar date) or other items (not shown) including a notification item (e.g., icon, badge, banner, etc.), an access tool to a particular application such as a camera application, and so forth. Although the multi-mode interface 114 is described in relation to the image 708 and having a background, the multi-mode interface 114 provides a display, and the display may include the image 708 and the background. Accordingly, the parameter adjustments described in relation to the image 708 can also, or instead, be applied to the display provided by the multi-mode interface 114. As will be described in more detail below, the multi-mode interface 114 may provide a black display, a low-luminosity display (with or without low color saturation), a monochrome display (with low or high luminosity), or a high-luminosity and color saturation display.

In response to expiration of the duration of time, the interaction manager 106 alters one or more display parameters (e.g., luminosity, color saturation) to darken the multi-mode interface 114 (shown in user device 702-3), which reduces power consumption. This is based on the user device 702 not detecting an explicit interaction(s) by the user 112 with the user device 702. In this darkened state of the ambient mode of the multi-mode interface 114, displayed objects and images may be maintained at a low luminosity as well as low color saturation (e.g., black and white, grayscale, dull, having muted colors, being "less colorful", and so forth). As shown in the user device 702-3, for example, the clock element 712 remains displayed while the lock icon 710 is removed. Alternatively, the lock icon 710 (or any other element) may remain displayed. The background of the multi-mode interface 114 is darkened as part of the decreased luminosity. Further, the image 708 of the star is faded to a low-luminosity version (including low brightness, low saturation, high or low contrast, or any combination thereof). Optionally, the image 708 may be sufficiently darkened so as to not be visible by the user 112. The multi-mode interface 114 may remain in the ambient mode 706 while the user 112 is present within the radar field 110 and not explicitly interacting with the user device 702, such as by touching the user device 702, performing a gesture (e.g., tap, double-tap, swipe, wave, etc.) to activate specific functionality of an application of the user device 702, pressing a button on the user device 702, and so on. Rather, the user's presence is considered to be an implicit interaction because the user is not actively and explicitly interacting with the user device 702.

Continuing to FIG. 8, when the user 112 reaches toward the user device 702, the interaction manager 106 causes the multi-mode interface to exit the ambient mode 706 and enter an alert mode 802. As the user's hand 804 moves toward the user device 702, the interaction manager 106 dynamically adjusts one or more display parameters, such as the luminosity, of the multi-mode interface 114. The rate of adjustment of these parameters may be based on various factors associated with the user's hand 804 and its movement, including the distance between the user's hand 804 and the user device 702, the speed at which that distance decreases (or increases if the user's hand 804 is moving away from the user device 702), and/or the position of the user's hand 804 relative to the user device 702. In this way, the multi-mode interface 114 provides dynamic visual feedback corresponding to the movements of the user's hand 804 toward (or away from) the user device 702.

In the illustrated example, only highly luminous portions of the image 708 are visible in the multi-mode interface 114 when the user's hand 804 begins to reach toward the user device 702-4. A dim version of the lock icon 710 is also maintained on the multi-mode interface 114. As the user's hand 804 moves closer to the user device 702 (e.g., 702-5), the image 708 is gradually revealed based on luminosity and/or other display parameters. Various portions of the image 708 (and other objects such as the lock icon 710) become more and more visible and luminous. The rate at which this occurs may be directly proportional to the rate of decrease in the distance between the user's hand 804 and the user device 702 (e.g., how quickly the user's hand 804 moves toward the user device 702). In some aspects, the image 708 remains in a desaturated state (e.g., grayscale) and more tones (e.g., shades of gray) are applied to the image 708 as the user's hand 804 moves closer to the user device 702-5. Optionally, one or more display parameters may also be adjusted to brighten the background of the multi-mode interface 114. However, the alert mode 802 of the multi-mode interface 114 is associated with a low-power operational state of the user device 702, so maintaining a dark background may help minimize power consumption when increasing the luminosity and/or other display parameters of the multi-mode interface 114 (or the image 708).

If, at this point, the user 112 moves his hand 804 away from the user device 702-5, the interaction manager 106 applies the above-described effects in reverse, such that the image 708 is gradually darkened (e.g., luminosity is gradually decreased) to return the multi-mode interface 114 to the darkened state of the alert mode 802 (shown at user device 702-4). If the distance between the user's hand 804 and the user device 702 becomes greater than a threshold distance, the interaction manager 106 may cause the multi-mode interface 114 to exit the alert mode 802 and re-enter the ambient mode 706.

In this way, the multi-mode interface 114 provides a dynamic visual response to the movements of the user's hand 804 as the user 112 reaches toward (or away from) the user device 702. This dynamic responsiveness presented in the form of visual feedback allows the user 112 to know that the user device 702 is "aware of" and is currently detecting the user's movements, which serves to educate the user 112 about the user device's awareness and capabilities while in a low-power or locked state.

To further enhance the user experience in regards to the user device's responsiveness to the user's movements relative to the user device 702, the interaction manager 106 may cause the multi-mode interface 114 to enter an active mode 806 in response to the user 112 being authenticated to the user device 702. When transitioning from the alert mode 802 to the active mode 806, color saturation of the multi-mode interface 114 is increased such that the image 708 is gradually filled with color, becoming richer and more vibrant. Accordingly, the user device 702-6 provides visual feedback, through the use of color, to indicate that the user 112 has been authenticated and is provided full access rights to the user device 702. The multi-mode interface 114 can also be adjusted in other aspects based on authentication of the user 112, such as by changing a position of, or replacing, one or more displayed elements (e.g., replacing the lock icon 710 with an unlock icon 808). These modifications can occur prior to presenting a home screen of the user device 702 or as part of the presentation of the home screen. The home screen, and additional pages, may be presented via the multi-mode interface 114 in the active mode 806. The image 708 and/or other objects or elements may be maintained on the multi-mode interface 114 concurrently with user-interface elements that are displayed on the home screen and additional pages.

The image 708 described with respect to FIGS. 7 and 8 may be a still image selected as part of a theme package of the operating system of the user device 702. Alternatively, the image 708 may be a user-selected still image, such as a digital photo or digital drawing, stored in the computer-readable media 204. In this way, the user 112 may customize the image displayed via the multi-mode interface 114 of the user device 702. Each image may be unique in how it is gradually revealed based on luminosity changes. Further, each image may be unique in how it is filled with color based on saturation changes when the user 112 is authenticated to the user device 702.

Other visual effects of the multi-mode interface 114 that correspond to radar-detected movements of the user 112 relative to the user device 702 are also contemplated. For example, rather than a still image, the image 708 may include a curated collection of images, a family of related images, or a sequence of images (e.g., video). A collection of images can be used to produce one or more objects or images that respond to the user's implicit interactions with the user device 702, such as by moving in subtle ways in association with the user's hand 804 movements and position relative to the user device 702. Some examples of this are shown in FIGS. 9A and 9B.

Figure 9A:
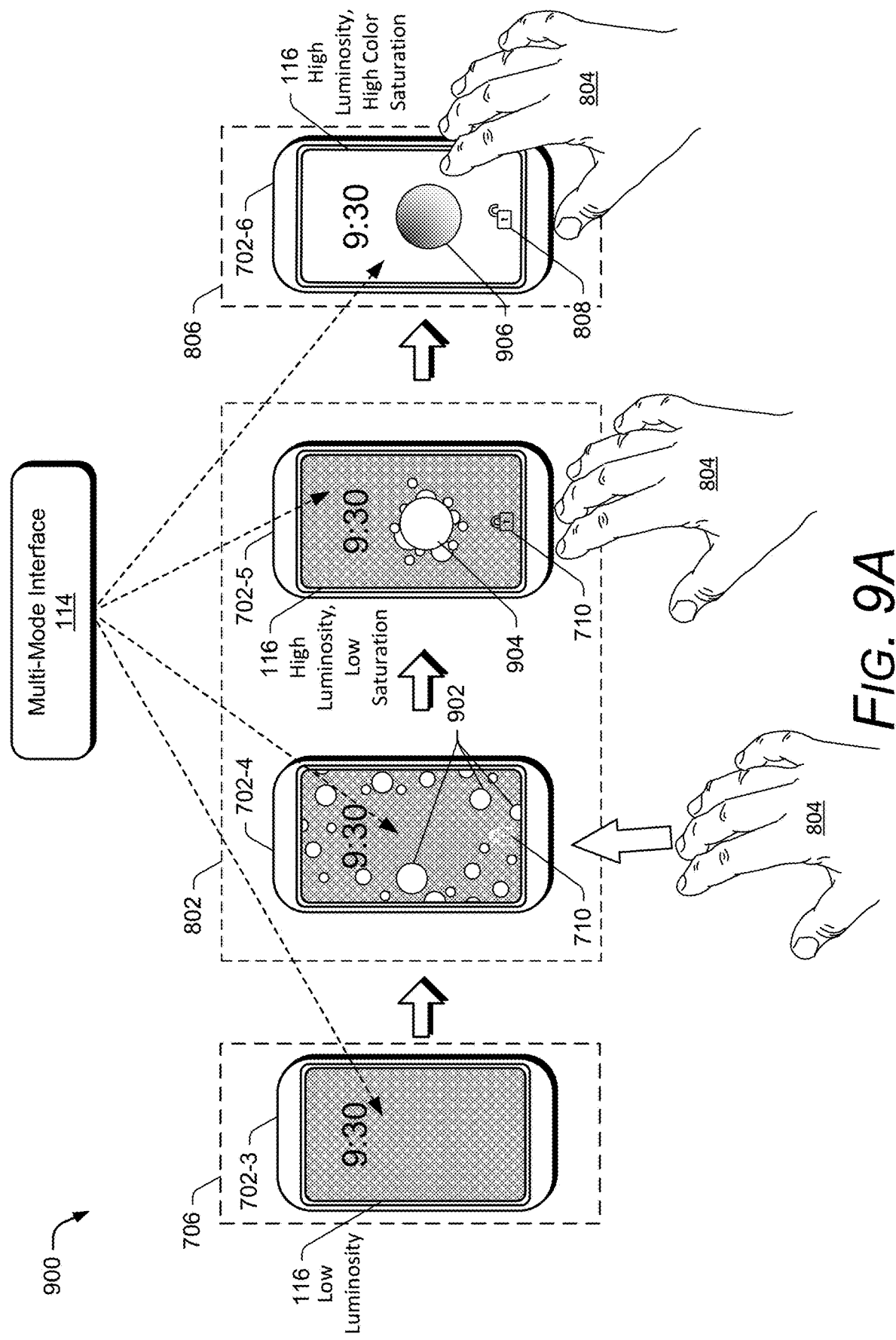
FIG. 9A illustrates another example implementation of the multi-mode interface that changes modes based on radar data indicating a user's implicit interactions with a mobile device.
Figure 9B:
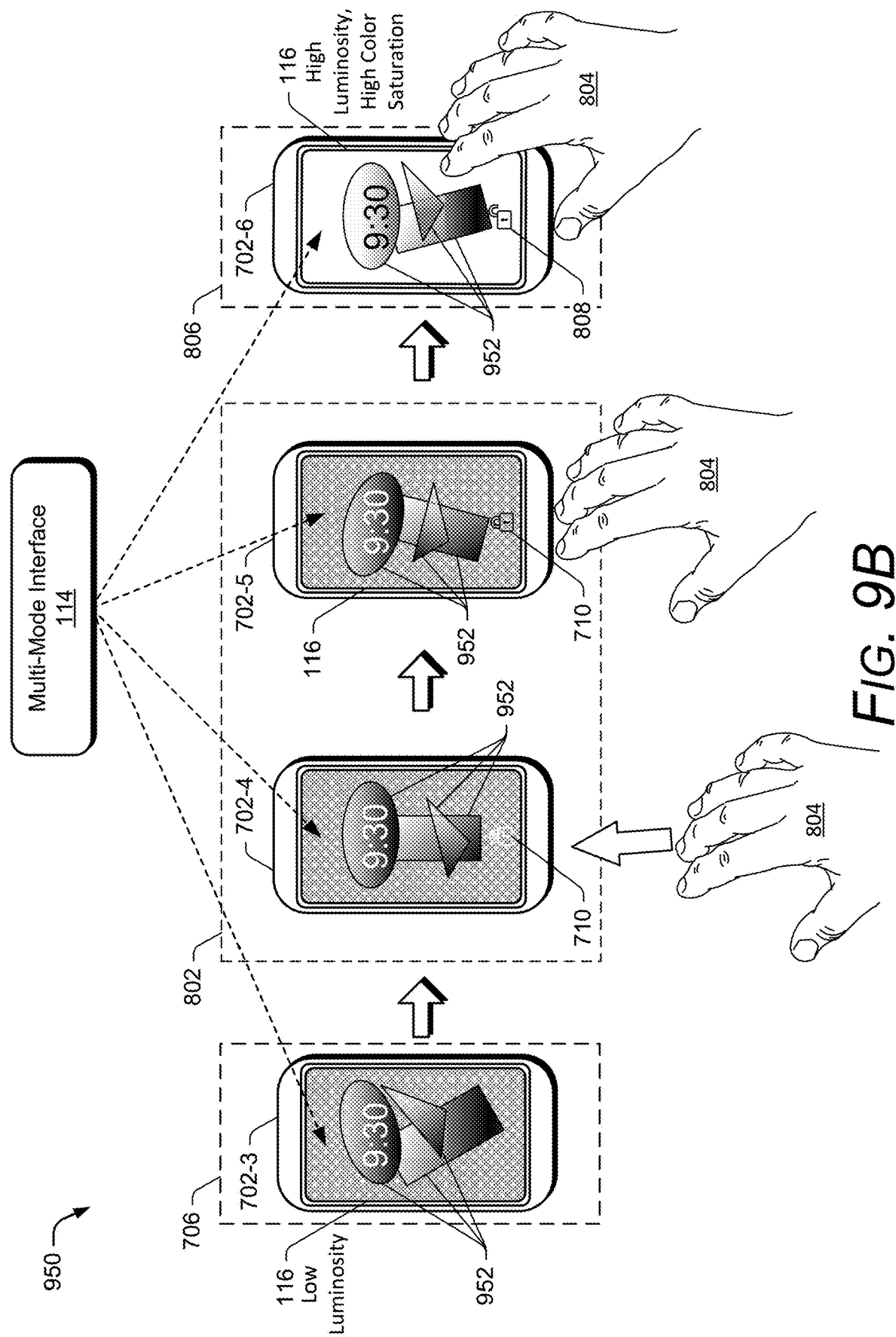
FIG. 9B illustrates another example implementation of the multi-mode interface that changes modes based on radar data indicating a user's implicit interactions with a mobile device.
Figure 10:
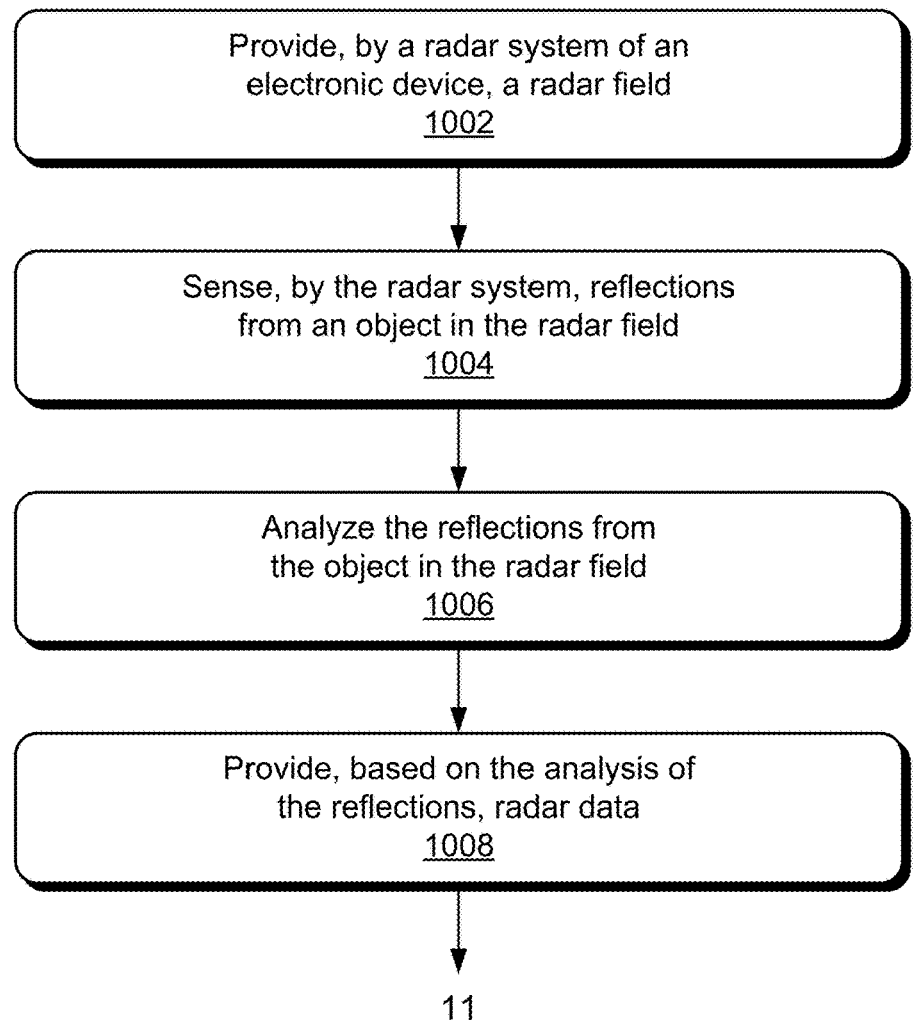
FIGS. 10 and 11 depict a method for a mobile device-based radar system for providing a multi-mode interface.
Figure 11:
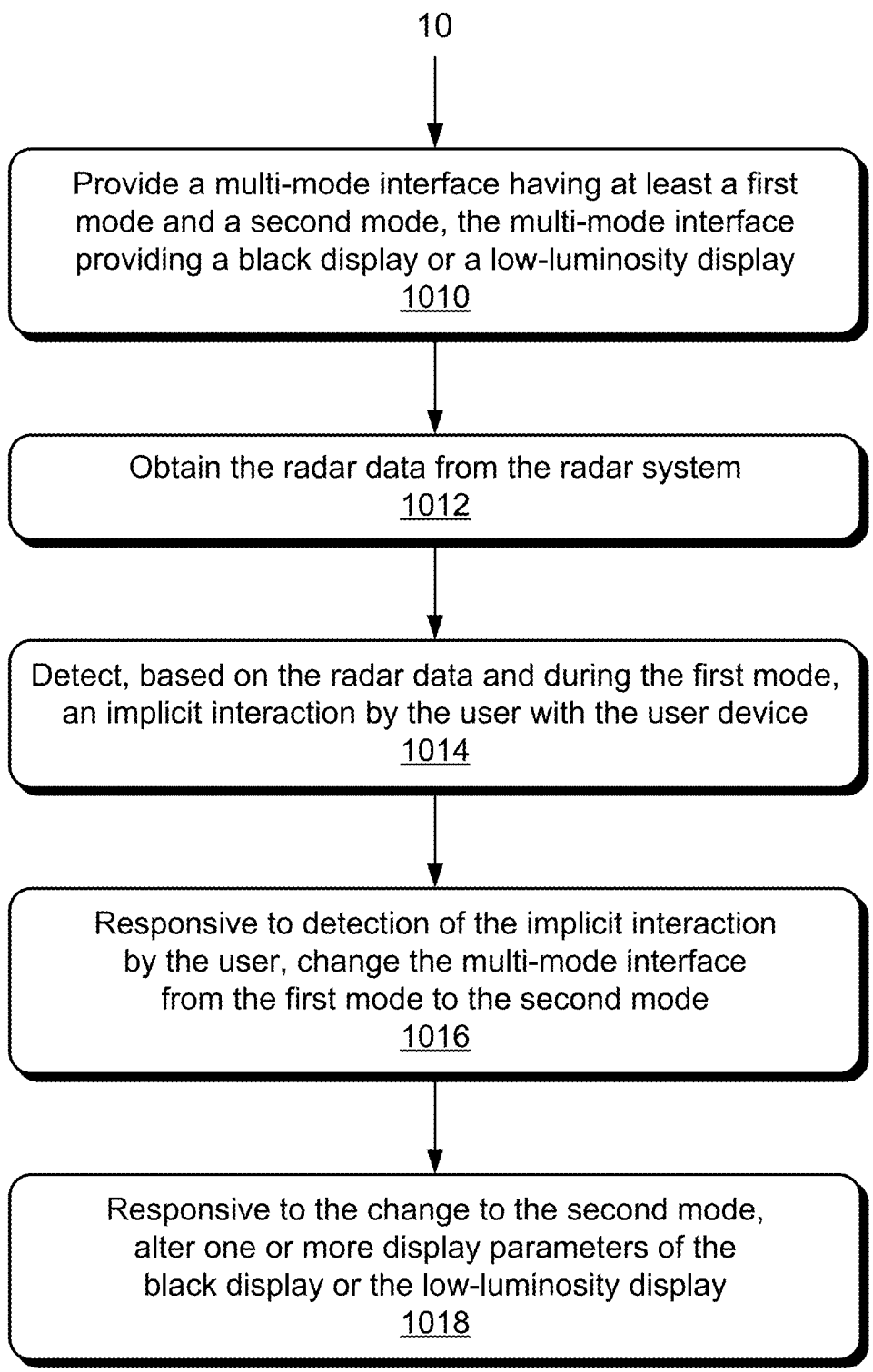

FIG. 9A illustrates an example implementation 900 of the multi-mode interface that changes modes based on radar data indicating a user's implicit interactions with a mobile device. Here, the user device 702-3 is illustrated with the multi-mode interface 114 in the ambient mode 706 (e.g., darkened state) based on the user's 112 presence being detected within the radar field 110 (not shown). In this example, no objects are displayed via the multi-mode interface 114. When the user 112 begins to reach toward the user device 702-4, the interaction manager 106 causes the multi-mode interface 114 to exit the ambient mode 706 and enter the alert mode 802. In the alert mode 802, one or more objects, such as small bubbles 902, start coming into view from the sides of the multi-mode interface 114. As the user's hand 804 gets closer to the user device 702-5, the bubbles 902 progressively move toward a specified location or area on the display 116. The rate at which the bubbles move may directly correspond to the rate at which the distance between the user's hand 804 and the user device 702 decreases. In some aspects, as the user's hand 804 gets closer to the user device 702, the bubbles 902 combine with one another and grow in size (shown as combining bubbles 904) until there is only one large bubble 906 at the specified location. During this movement towards the specified location, the bubbles 902, 904 may become more luminous, particular as they combine with one another. If the user's hand 804 moves away from the user device 702-5, the bubbles 904 start to pull apart from one another and move back toward the sides of the multi-mode interface 114. The luminosity of the bubbles 902, 904 may also decrease as they move away from each other.

At some point, the user 112 may be authenticated to the user device 702 by a user-recognition system (e.g., based on a password, a passcode, a fingerprint, and so on). In response to the user 112 being authenticated, the multi-mode interface 114 enters the active mode 806. Upon entering the active mode 806, the interaction manager 106 adjusts display parameters of the multi-mode interface 114, such as color saturation. Here, the one large bubble 906 gradually progresses from grayscale (desaturation or low saturation) to color (high saturation) to provide an indication that the user 112 has been authenticated to full rights. Additional lighting effects may be applied based on the position of the user's hand 804 relative to the user device 702. Here, the user's hand 804 is located to the lower right side of the user device 702 (when in a portrait mode orientation) and based on this positioning, lighting effects are applied to the bubble 906 as if the user's hand 804 were a light source shining light onto the bubble 906. Alternatively, the positioning of the user's hand 804 can be used to apply lighting effects in the opposite direction to produce the visual effect that the light source is shining toward the user's hand 804. Of course, lighting effects can be applied using any suitable direction.

As part of the applied visual effects that indicate that the user 112 has been authenticated, the bubble 906 may move to a different location. For example, the bubble 906 may quickly move toward or away from the user's hand 804. The bubble 906 may move toward and collide with the lock icon 710, causing the lock icon 710 to be replaced with the unlock icon 808. This may produce a dramatic effect of the lock being broken open by the bubble 906. In some aspects, the bubble 906 may change shape, size, or color. Accordingly, a variety of changes may occur in response to the multi-mode interface 114 entering the active mode 806, some of which may include the displayed objects appearing to interact with other displayed items on the display 116.

In another example, the curated collection of images can include abstract shapes that, during the alert mode 802 of the multi-mode interface 114, move, bend, and/or reshape based on the user's hand 804 movements and relative positioning. This may be in addition to the change in luminosity as described above. Each of the images may be associated with unique positioning information corresponding to a position of the user's hand 804 relative to the user device 702 (e.g., distance between the user device 702 and the user's hand 804 combined with a location of the user's hand 804 relative to an orientation of the user device 702). This allows a different image to be presented based on where the user's hand 804 is positioned (proximity and direction) relative to the user device 702. In this way, the abstract shapes or other displayed objects may appear to react to the user's hand movements around the user device 702 in subtle and interesting ways, while the user device 702 is in a locked state. An example of this is described below in relation to FIG. 9B.

FIG. 9B illustrates another example implementation 950 of a multi-mode interface that changes modes based on radar data indicating a user's implicit interactions with a mobile device. Here, the user device 702-3 is illustrated with the multi-mode interface 114 in the ambient mode 706 based on the user's presence being detected within the radar field 110 (not shown). In this example, objects 952 are provided in a low-luminosity display by the multi-mode interface 114. The objects are rendered via the display 116. The objects 952 can be any object, shape, or image. The objects 952 have an initial position during the ambient mode 706 of the multi-mode interface 114, an example of which is illustrated on the display 116 of user device 702-3.

When the user 112 begins to reach toward the user device 702-4, the interaction manager 106 causes the multi-mode interface 114 to exit the ambient mode 706 and enter the alert mode 802. In the alert mode 802, one or more of the objects 952 move. As the user's hand 804 gets closer to the user device 702-5, the objects 952 continue to move. The rate and/or distance that the objects 952 move may directly correspond to the rate at which the distance between the user's hand 804 and the user device 702 decreases. The objects 952 can move in any direction and can change directions based on how close the user's hand 804 is to the user device 702. In addition to, or alternative to, shifting in a certain direction, the movement of the objects 952 may include 3D rotation in any direction. Further, each object 952 may move independently of the other objects 952. One or more of the objects 952 may also change its shape or size as the user's hand 804 approaches the user device 702.

Similar to the above-described implementations, the multi-mode interface 114 may provide a low-luminosity display during the ambient mode 706 and initially during the alert mode 802. The luminosity during the alert mode 802 is adjustable based on the changing distance between the user device 702 and the user's hand 804. In some aspects, the multi-mode interface 114 provides a monochrome display during the ambient mode 706 and the alert mode 802. Alternatively, the multi-mode interface 114 can provide a low color saturation display during these modes.

In response to the user being authenticated to the user device 702, the multi-mode interface 114 enters the active mode 806. Upon entering the active mode 806, the interaction manager 106 adjusts display parameters of the multi-mode interface 114, such as color saturation. Here, the objects 952 progress from grayscale to color to provide a visual indication that the user 112 has been authenticated to full rights. For example, as shown on user device 702-6, the multi-mode interface 114 provides a high-luminosity and high-saturation display. As in the other described implementations, additional lighting effects can be applied to the objects 952 in any suitable way. The objects 952 an also move further in response to the authentication. Here, the objects 952 moved back toward their original positions in the ambient mode 706. However, the objects 952 may or may not reach those original positions.

Example Methods

FIGS. 10-14 depict example methods 1000 and 1200, which enable a mobile device-based radar system for providing a multi-mode interface that changes modes based on a user's implicit interactions with the user device. The methods 1000 and 1200 can be performed with an electronic device that uses a radar system to provide a radar field. The radar field is used to determine implicit interactions of a user with a user device, such as a presence of the user in the radar field and movement of the user relative to the user device. Based on the determination of the user's presence and movements, the electronic device can cause a multi-mode interface to enter and exit different modes of functionality and provide different displays based on the modes.

The method 1000 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-6, reference to which is made for example only. The techniques are not limited to performance by one entity or multiple entities operating on one device.

At 1002, a radar field is provided. This radar field can be provided by any of a variety of electronic devices (e.g., the user device 102, 702 described above), that include, or are associated with, a radar system (e.g., the radar system 104) and an interaction manager (e.g., the interaction manager 106, which may also include the multi-mode interface 114). Further, the radar field may be any of a variety of types of radar fields, such as the radar field 110 described above.

At 1004, reflections from an object in the radar field are sensed by the radar system. The object may be any of a variety of objects, such as wood, plastic, metal, fabric, or organic material (e.g., a person, such as the user 112 described above, or a body part of a person, such as the user's hand 804 described above). For clarity, the object is referred to as "the user" or "users" while describing the method 1000.

At 1006, the reflections from the object in the radar field are analyzed. The analysis may be performed by any of a variety of entities (e.g., the radar system 104, the interaction manager 106, or another entity) and may include various operations or determinations, such as those described with reference to FIGS. 3-6.

At 1008, based on the analysis of the reflections, radar data is provided (e.g., the radar data described with reference to FIGS. 1-6). The radar data may be provided by any of a variety of entities, such as the radar system 104, the interaction manager 106, or another entity. In some implementations, the radar system may provide the radar data and pass the radar data to other entities (e.g., any of the described radar-based applications, interaction managers, or modules). The description of the method 1000 continues in FIG. 11, as indicated by the number "11" after block 1008 of FIG. 10, which corresponds to the number "10" before block 1010 of FIG. 11.

At 1010, a multi-mode interface having at least a first mode and a second mode is provided. This multi-mode interface (e.g., the multi-mode interface 114) may be provided by the interaction manager 106 of the user device 102. The first and second modes may include any of the dormant, ambient, reach, or active modes described above. These modes enable different functionalities for the multi-mode interface, examples of which are described above with respect to FIGS. 7-9.

At 1012, the radar data is obtained from the radar system. For example, the radar-based interaction manager 106 obtains the radar data from the radar system 104. The radar data can be obtained in any suitable way.

At 1014, based on the radar data and during the first mode, an implicit interaction by the user with the user device is detected. The implicit interaction can be detected by the interaction manager 106 of the user device 102. In aspects, the implicit interaction may include movements by the user 112 relative to the user device 102, such as entering the radar field 110, reaching a hand toward (or away from) the user device 102, and so forth.

At 1016, responsive to detection of the implicit interaction by the user, the multi-mode interface is changed from the first mode to the second mode. Depending on what the implicit interaction includes, the multi-mode interface 114 can exit any one of the dormant, ambient, reach, and active modes and enter any other of those modes. For instance, the interaction manager 106 may cause the multi-mode interface 114 to exit the dormant mode and enter the ambient mode when the user enters the radar field 110. Alternatively, if the user device 102 is located in a user's pocket or bag and the user reaches into the pocket or bag to grab the user device 102 (and the multi-mode interface 114 is in the dormant mode), the multi-mode interface 114 can exit the dormant mode and enter the alert mode. In other aspects, when the user begins reaching toward the user device 102, the interaction manager 106 may cause the multi-mode interface 114 to exit the ambient mode and enter the alert mode. When the user is authenticated to use the user device, the interaction manager 106 may cause the multi-mode interface 114 to exit a current mode (dormant mode, ambient mode, or alert mode) and enter the active mode. In another example, the multi-mode interface 114 may exit the alert mode and enter the ambient mode when the user 112, prior to authentication, pulls his hand away from the user device 102 to a distance greater than a specified distance threshold. The distance threshold may be used as an indicator that the user 112 does not intend to interact with the user device 102. Alternatively, the multi-mode interface 114 may be in the ambient mode with the user 112 nearby, and without reaching toward the device 102, the user 112 may be authenticated (e.g., based on biometric recognition techniques) and the multi-mode interface 114 can exit the ambient mode and enter the active mode.

At 1018, responsive to the change to the second mode, one or more parameters of an image associated with the multi-mode interface are adjusted. When the multi-mode interface 114 exits one mode and enters another mode, various parameters, such as luminosity or color saturation may be adjusted. For example, the luminosity may be increased when entering the alert mode from the ambient mode or the dormant mode, and further increased as the user 112 reaches a hand toward the user device 102. If the user 112 pulls his hand away from the user device 102, the luminosity may be decreased. The color saturation may be increased when the multi-mode interface 114 enters the active mode. When entering the ambient mode, the luminosity may be adjusted to a high luminosity (e.g., a level greater than a specified threshold level luminosity) for a specified duration of time to provide a higher-luminosity version of the image, and after expiration of the duration of time, the luminosity may be adjusted to a low luminosity (e.g., a level lower than a specified threshold level luminosity) to provide a lower-luminosity version of the image. Accordingly, various parameters may be adjusted in response to a change in the operational mode of the multi-mode interface 114.

The method 1200 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-11, reference to which is made for example only. The techniques are not limited to performance by one entity or multiple entities operating on one device.

At 1202, a user device provides a multi-mode interface for display during a locked state of the user device. The user device may be any of a variety of electronic devices (e.g., the user device 102, 702 described with respect to FIGS. 1-9). The multi-mode interface includes multiple operational modes including at least a first mode and a second mode. Example modes of the multi-mode interface may include a dormant mode, an ambient mode, an alert mode, and an active mode. These example modes are described in further detail above with respect to FIGS. 7-9.

At 1204, the user device obtains radar data from a radar system when the user device is in the locked state. This radar data may represent reflections from an object in a radar field generated by the radar system. The object may be a user or some radar-detectable object carried by the user.

At 1206, the user device detects, based on the radar data, that the object is within a threshold distance from the user device and is moving toward the user device. As described above, the object may be a user's hand or another object that is detectable by the radar system.

At 1208, the user device causes the multi-mode interface to exit a first mode and enter a second mode in response to detecting that the object is within the threshold distance from the user device and is moving toward the user device. The multi-mode interface may be entered into the second mode by the interaction manager 106 or by another entity. In aspects, the first mode may be the ambient mode in which the multi-mode interface is periodically responsive to the object's movements. The second mode may be the alert mode in which the multi-mode interface is dynamically visually responsive to the movements of the object and less-than-full rights are provided to the user.

Figure 12:
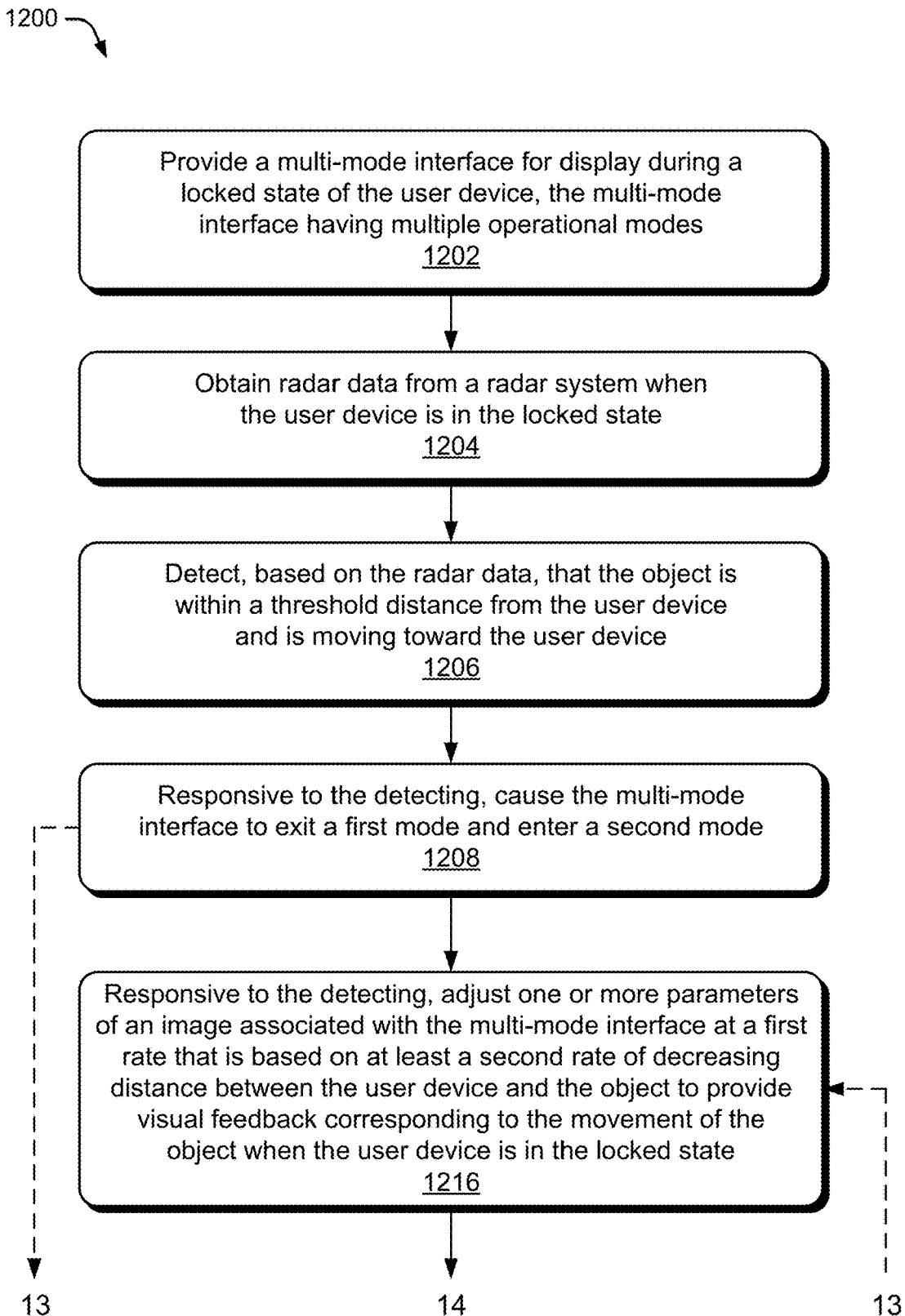
FIGS. 12-14 depict a method for a user device to provide a multi-mode interface that changes modes based on a user's implicit interactions with the user device.
Figure 13:
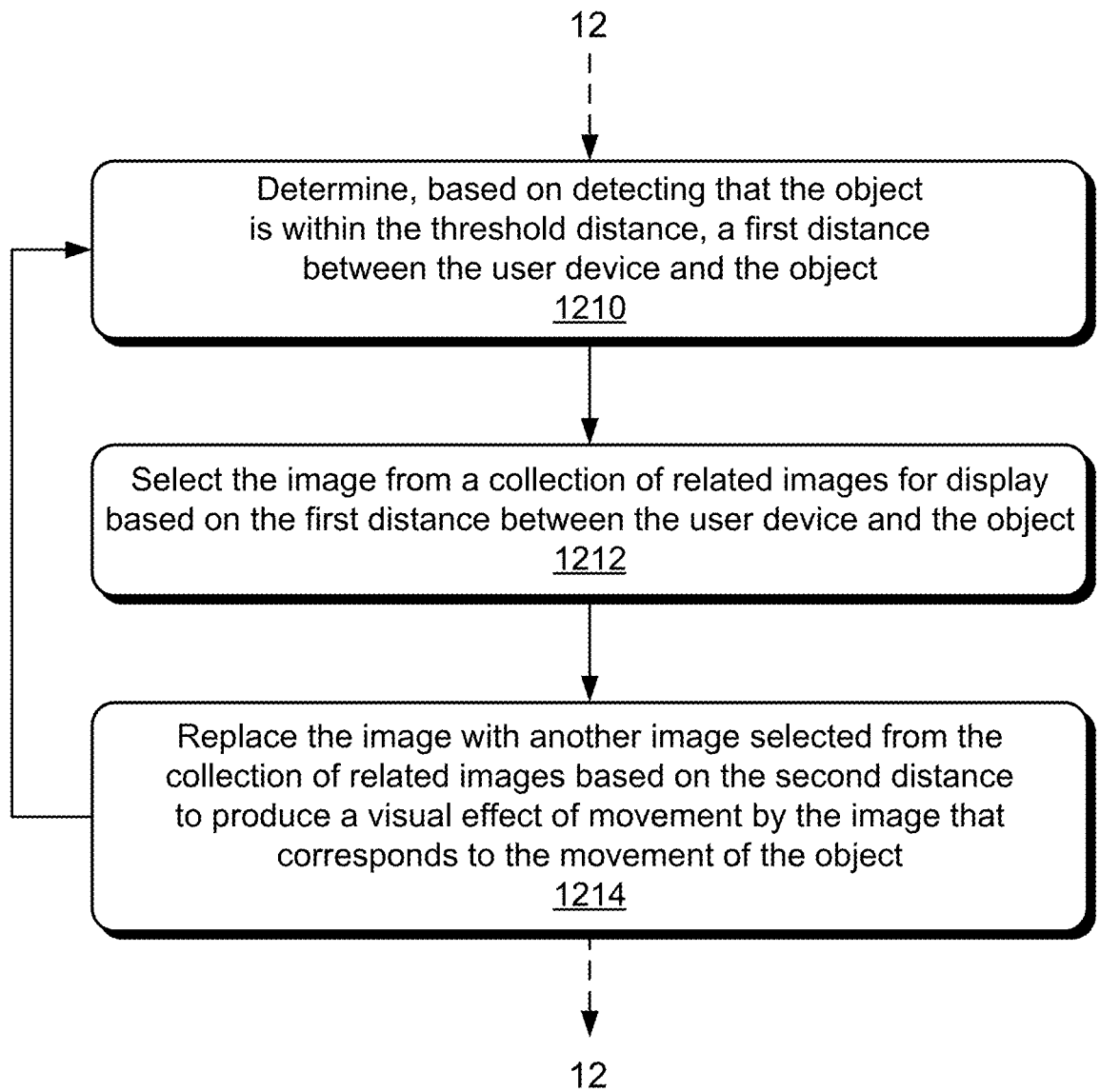
Figure 14:
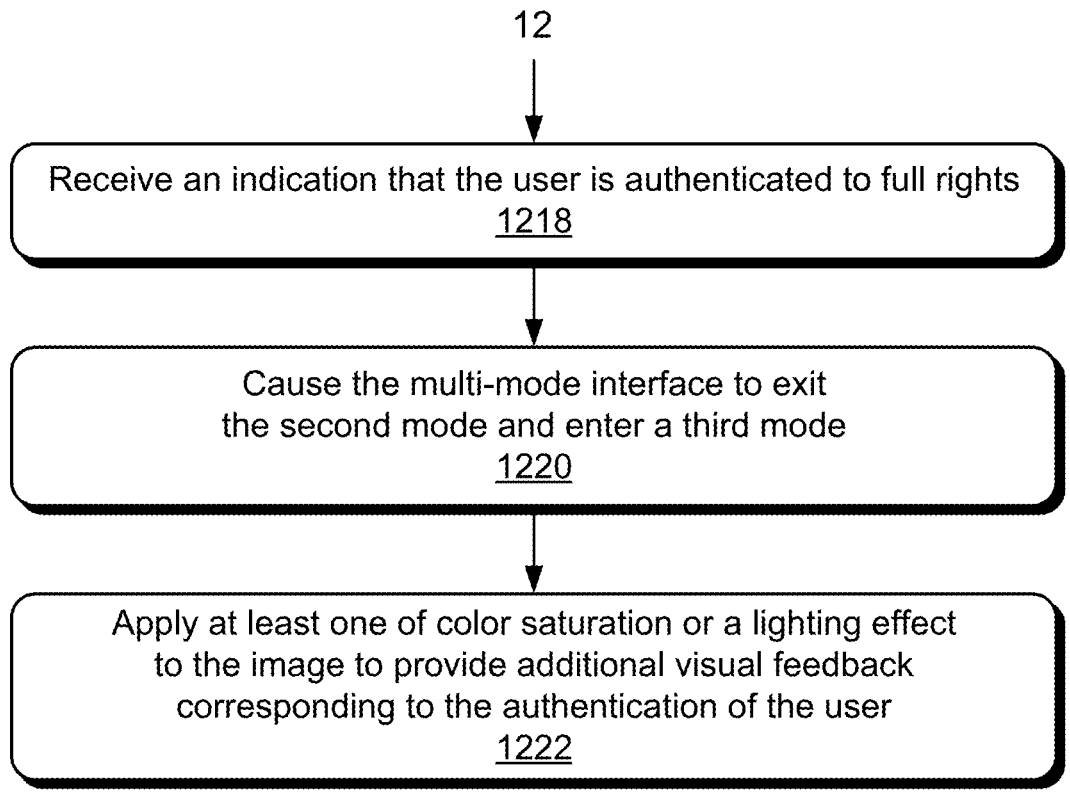

Optionally, the method 1200 may proceed to FIG. 13, as indicated by the number "13" after block 1208 of FIG. 12, which corresponds to the number "12" before block 1210 of FIG. 13. At 1210, the user device determines, based on detecting that the object is within the threshold distance, a first distance between the user device and the object.

At 1212, the user device selects the image from a collection of related images for display based on the first distance between the user device and the object. The image may be selected by the interaction manager 106 or by another entity of the user device 102.

At 1214, responsive to the first distance between the user device and the object changing to a second distance, the user device replaces the image with another image selected from the collection of related images based on the second distance. Then, the process returns to 1218 to repeat the distance determination (at 1218), the image selection (at 1220), and the image replacement (at 1222) to produce a visual effect of movement in the displayed image that corresponds to the movement of the object. An example visual effect of this image-replacement process is described with respect to FIGS. 9A and 9B, where the displayed objects appear to move in relation to movement of the user's hand. This visual effect can be applied by repeatedly changing the image based on changes to the distance between the user's hand and the user device, where the images are from a collection of related images that each correspond to a unique position of the user's hand relative to the user device. Further, the change occurs smoothly to provide the visual effect of movement of the displayed objects. Next, the method 1200 may proceed to FIG. 12, as indicated by the number "12" after block 1214 of FIG. 13, which corresponds to the number "13" before block 1216 of FIG. 12.

At 1216, responsive to the multi-mode interface entering the second mode, the user device adjusts one or more display parameters of the multi-mode interface (or of a display provided by the multi-mode interface 114) at a first rate that is based on at least a second rate of decreasing distance between the user device and the object to provide dynamic visual feedback corresponding to the movement of the object when the user device is in the locked state. In aspects, the first rate of adjusting the one or more parameters of the image is directly proportional to the second rate at which the object is approaching the user device. The description of the method 1200 continues in FIG. 14, as indicated by the number "14" after block 1216 of FIG. 12, which corresponds to the number "12" before block 1218 of FIG. 14.

At 1218, the user device receives an indication that the user is authenticated to full rights. The user may be authenticated using any suitable user-recognition system, examples of which are described above.

At 1220, the user device, in response to the authentication of the user, causes the multi-mode interface to exit the second mode and enter a third mode. In aspects, this third mode may be an active mode in which the user is provided full rights to the user device 102.

At 1222, responsive to the multi-mode interface entering the third mode, the user device applies color saturation and/or lighting effects to the image to provide additional visual feedback corresponding to the authentication of the user. Examples of this are described with respect to FIGS. 7-9. The color saturation and/or lighting effects provide visual feedback to the user to indicate that the full rights have been granted to the user (e.g., the user has successfully been authenticated to use the user device and the user device is now unlocked).

Example Computing System

Figure 15:
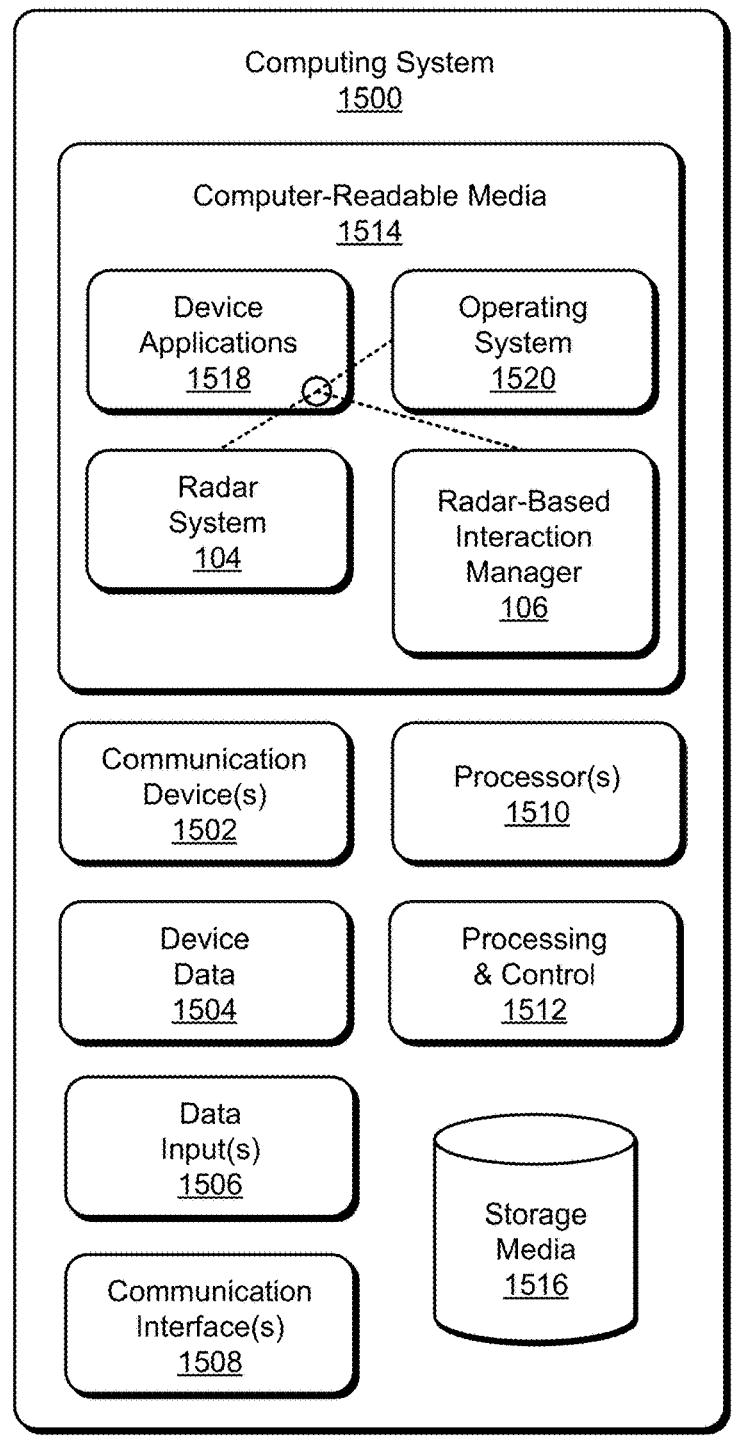
FIG. 15 illustrates an example computing system that can be implemented as any type of client, server, and/or electronic device as described with reference to FIGS. 1-14 to implement, or in which techniques may be implemented that enable, a mobile device-based radar system for providing a multi-mode interface.

FIG. 15 illustrates various components of an example computing system 1500 that can be implemented as any type of client, server, and/or electronic device as described with reference to the previous FIGS. 1-14 to implement a mobile device-based radar system for providing a multi-mode interface.

The computing system 1500 includes communication devices 1502 that enable wired and/or wireless communication of device data 1504 (e.g., radar data, authentication data, reference data, received data, data that is being received, data scheduled for broadcast, and data packets of the data). The device data 1504 or other device content can include configuration settings of the device, media content stored on the device, and/or information associated with a user of the device (e.g., an identity of a person within a radar field or customized gesture data). Media content stored on the computing system 1500 can include any type of radar, biometric, audio, video, and/or image data. The computing system 1500 includes one or more data inputs 1506 via which any type of data, media content, and/or inputs can be received, such as human utterances, interactions with a radar field, touch inputs, user-selectable inputs or interactions (explicit or implicit), messages, music, television media content, recorded video content, and any other type of audio, video, and/or image data received from any content and/or data source.

The computing system 1500 also includes communication interfaces 1508, which can be implemented as any one or more of a serial and/or a parallel interface, a wireless interface, any type of network interface, a modem, and as any other type of communication interface. The communication interfaces 1508 provide a connection and/or communication links between the computing system 1500 and a communication network by which other electronic, computing, and communication devices communicate data with the computing system 1500.

The computing system 1500 includes one or more processors 1510 (e.g., any of microprocessors, controllers, or other controllers) that can process various computer-executable instructions to control the operation of the computing system 1500 and to enable techniques for, or in which can be implemented, a mobile device-based radar system for providing a multi-mode interface. Alternatively or additionally, the computing system 1500 can be implemented with any one or combination of hardware, firmware, or fixed logic circuitry that is implemented in connection with processing and control circuits, which are generally identified at 1512. Although not shown, the computing system 1500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1500 also includes computer-readable media 1514, such as one or more memory devices that enable persistent and/or non-transitory data storage (e.g., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1500 can also include a mass storage media device (storage media) 1516.

The computer-readable media 1514 provides data storage mechanisms to store the device data 1504, as well as various device applications 1518 and any other types of information and/or data related to operational aspects of the computing system 1500. For example, an operating system 1520 can be maintained as a computer application with the computer-readable media 1514 and executed on the processors 1510. The device applications 1518 may include a device manager, such as any form of a control application, software application, signal-processing and control modules, code that is native to a particular device, an abstraction module, a gesture recognition module, and other modules. The device applications 1518 may also include system components, engines, modules, or managers to implement a mobile device-based radar system for providing a multi-mode interface, such as the radar system 104 or the interaction manager 106. The computing system 1500 may also include, or have access to, one or more machine learning systems.

Several examples are described below.

Example 1

A user device comprising:
a radar system, implemented at least partially in hardware, configured to:
provide a radar field;
sense reflections from a user in the radar field;
analyze the reflections from the user in the radar field; and
provide, based on the analysis of the reflections, radar data;
one or more computer processors; and
one or more computer-readable media having instructions stored thereon that, responsive to execution by the one or more computer processors, implement a radar-based interaction manager configured to:
provide a multi-mode interface having at least a first mode and a second mode, the multi-mode interface providing a black display or a low-luminosity display during the first mode;
detect, based on the radar data and during the first mode, a presence of the user or threshold movement by the user in relation to the user device;
responsive to detection of the presence or threshold movement of the user, change the multi-mode interface from the first mode to the second mode; and
responsive to the change to the second mode, cause the multi-mode interface to provide visual feedback corresponding to the presence or threshold movement by the user by altering one or more display parameters of the black display or the low-luminosity display.

Example 2

The user device of example 1, wherein:
the first mode comprises a dormant mode in which the multi-mode interface is in a dormant state and provides the black display;
the second mode comprises an ambient mode in which the user device detects the presence of the user within the radar field and the multi-mode interface provides the low-luminosity display; and
the radar-based interaction manager is configured to alter the one or more display parameters by increasing at least a luminosity of the black display to provide the low-luminosity display.

Example 3

The user device of example 1, wherein:
the first mode comprises a dormant mode in which the multi-mode interface is in a dormant state and provides the black display; and
the second mode comprises a alert mode in which the radar data indicates that the user is reaching toward the user device and the multi-mode interface provides the low-luminosity display, the alert mode providing less-than-full rights to the user; and
the radar-based interaction manager is configured to dynamically adjust at least a luminosity of the low-luminosity display based on movements of a hand of the user toward or away from the user device when the multi-mode interface is in the alert mode effective to cause the multi-mode interface to provide dynamically responsive visual feedback corresponding to the movements of the hand of the user.

Example 4

The user device of example 1, wherein:
the first mode comprises a dormant mode in which the multi-mode interface is in a dormant state and provides the black display;
the first mode provides less-than-full rights to a user of the user device;
the second mode comprises an active mode providing full rights to an authenticated user and a high-luminosity and color saturation display; and
the one or more display parameters of the black display are altered to provide the high-luminosity and color saturation display.

Example 5

The user device of example 1, wherein:
the first mode comprises an ambient mode in which the user device detects the presence of the user within the radar field, the multi-mode interface providing the low-luminosity display during the first mode; and
the second mode comprises an alert mode in which the radar data indicates that the user is reaching toward the user device, the multi-mode interface initially providing the low-luminosity display during the alert mode, the alert mode enabling the radar-based interaction manager to adjust at least the luminosity of the low-luminosity display based on movements of a hand of the user toward or away from the user device effective to cause the multi-mode interface to provide dynamically responsive visual feedback corresponding to the movements of the user's hand.

Example 6

The user device of example 1, wherein:
the first mode comprises an ambient mode in which the user device detects the presence of the user within the radar field, the first mode providing less-than-full rights to the user and the low-luminosity display, the low-luminosity display having low-color saturation;
the second mode comprises an active mode providing full rights to an authenticated user and a high-luminosity and color saturation display; and
the radar-based interaction manager alters the one or more parameters of the low-luminosity display by increasing the luminosity and color saturation to transition from the low-luminosity display to the high-luminosity and color saturation display.

Example 7

The user device of example 1, wherein:
the first mode comprises an alert mode in which the radar data indicates that the user is reaching toward the user device, the alert mode providing less-than-full rights to the user and the low-luminosity display, the low-luminosity display having low-color saturation;
the alert mode enables the radar-based interaction manager to adjust at least a luminosity of the low-luminosity display and cause the multi-mode interface to provide dynamically responsive visual feedback corresponding to movements of a hand of the user toward or away from the user device based on the adjustments to at least the luminosity of the low-luminosity display;
the second mode comprises an active mode providing full rights to an authenticated user and a high-luminosity and color saturation display; and
the radar-based interaction manager is configured to alter the one or more parameters by increasing the luminosity and color saturation of the low-luminosity display to transition to the high-luminosity and color saturation display.

Example 8

The user device of example 1, wherein:
the first mode comprises a dormant mode in which the multi-mode interface is in a dormant state and provides the black display;
the second mode comprises an ambient mode in which the user device detects the presence of the user within the radar field, the multi-mode interface providing the low-luminosity display during the ambient mode;
the multi-mode interface includes a third mode comprising an alert mode in which the multi-mode interface provides dynamic visual feedback that is responsive to the movement of the user toward or away from the user device based on adjustments of at least the luminosity of the low-luminosity display that correspond to the movement of the user; and
the radar-based interaction manager is further configured to:
responsive to detection of a second implicit interaction by the user with the user device, cause the multi-mode interface to exit the ambient mode and enter the alert mode; and responsive to the multi-mode interface entering the alert mode, adjust one or more additional parameters of the low-luminosity display.

Example 9

The user device of example 1, wherein:
the first mode comprises a dormant mode in which the multi-mode interface is in a dormant state and provides the black display;
the second mode comprises an ambient mode in which the user device detects the presence of the user within the radar field and the multi-mode interface provides the low-luminosity display, the low-luminosity display having low-color saturation;
the first mode and the second mode each provide less-than-full rights to the user;
the multi-mode interface includes a third mode comprising an active mode providing full rights to an authenticated user and a high-luminosity and color saturation display; and
the radar-based interaction manager is further configured to:
responsive to authentication of the user with the user device, cause the multi-mode interface to exit the ambient mode and enter the active mode; and
responsive to the multi-mode interface entering the active mode, cause the multi-mode interface to provide visual feedback corresponding to the authentication of the user by altering the luminosity and the color saturation of the low-luminosity display to transition to the high-luminosity and color saturation display.

Example 10

The user device of example 1, wherein:
the first mode comprises an ambient mode in which the user device detects the presence of the user within the radar field and the multi-mode interface provides the low-luminosity display, the low-luminosity display having low-color saturation during the ambient mode;
the second mode comprises an alert mode in which the radar data indicates that the user is reaching toward the user device, the radar-based interaction manager adjusts at least the luminosity of the image based on movements of the user relative to the user device, and the multi-mode interface provides dynamic visual feedback that is responsive to the movements of the user relative to the user device;
the ambient mode and the alert mode both provide less-than-full rights to the user;
the multi-mode interface includes a third mode comprising an active mode that provides full rights to an authenticated user and a high-luminosity and color saturation display; and
the persistent radar-based interaction manager is further configured to:
responsive to authentication of the user with the user device, cause the multi-mode interface to exit the alert mode and enter the active mode; and
responsive to the multi-mode interface entering the active mode, increasing the luminosity and color saturation of the low-luminosity display to provide the high-luminosity and color saturation display.

Example 11

The user device of example 1, wherein the low-luminosity is defined by a luminosity level that is less than a predefined threshold level, the predefined threshold level corresponding to approximately 50%, 40%, 25% or 15% of the maximum luminosity.

Example 12

A method implemented in a user device, the method comprising:
providing a multi-mode interface having at least a first mode and a second mode, the multi-mode interface providing a black display or a low-luminosity display during the first mode;
obtaining radar data from a radar system when the user device is in a locked state, the radar data representing reflections from a user in a radar field generated by the radar system;
detecting, based on the radar data and during the first mode, a presence or threshold movement by the user in relation to the user device;

responsive to detection of the presence or threshold movement by the user, cause the multi-mode interface to change from the first mode to the second mode; and responsive to the change to the second mode, causing the multi-mode interface to provide visual feedback corresponding to the presence or threshold movement by the user by altering one or more display parameters of the black display or the low-luminosity display.

Example 13

The method of example 12, wherein:

causing the multi-mode interface to change from the first mode to the second mode comprises causing the multi-mode interface to exit a dormant mode and enter an ambient mode;

in the dormant mode, the multi-mode interface is in a dormant state and the black display is provided; and in the ambient mode, the user device detects the presence of the user within a specified distance from the user device and the low-luminosity display is provided.

Example 14

The method of example 13, further comprising:

in response to the multi-mode interface changing to the ambient mode, increasing a luminosity of the black display for a specified duration of time to provide a high-luminosity display; and in response to expiration of the specified duration of time, decreasing the luminosity of the high-luminosity display to provide the low-luminosity display.

Example 15

The method of example 12 wherein:

causing the multi-mode interface to change from the first mode to the second mode comprises causing the multi-mode interface to exit an ambient mode and enter an alert mode;

in the ambient mode, the user device detects the presence of the user within a predefined distance from the user device and the multi-mode interface provides the black display; and in the alert mode, the radar-based interaction manager is configured to cause the multi-mode interface to provide dynamic visual feedback that is responsive to movements of a user's hand moving toward or away from the user device based on adjustments of at least the luminosity of the low-luminosity display that corresponds to the radar data from the radar system.

Example 16

The method of example 15, further comprising, responsive to the multi-mode interface entering the alert mode, adjusting at least the luminosity of the low-luminosity display at a first rate that is based on at least a second rate of decreasing distance between the user device and the user's hand effective to provide the dynamic visual feedback corresponding to the movement of the user's hand.

Example 17

The method of example 12, wherein:

causing the multi-mode interface to change from the first mode to the second mode comprises causing the multi-mode interface to exit an alert mode and enter an active mode;

in the alert mode, the multi-mode interface provides the low-luminosity display with low-color saturation, the radar-based interaction manager adjusts at least the luminosity of the low-luminosity display based on movements of the user's hand moving toward or away from the user device, and the multi-mode interface provides dynamically responsive visual feedback corresponding to the movements of the user's hand based on the adjustments to at least the luminosity of the low-luminosity display, the alert mode providing less-than-full rights to the user;

the active mode provides full rights to the user based on authentication of the user to the user device; and the multi-mode interface provides a high-luminosity and color saturation display during the active mode.

Example 18

The method of example 17, further comprising, responsive to the multi-mode interface entering the active mode, applying color saturation or lighting effects to the low-luminosity display to transition to the high-luminosity and color saturation display effective to provide additional visual feedback corresponding to the authentication of the user.

Example 19

A method implemented in a user device that includes a radar system, the method comprising:

providing, by the radar system, a radar field;

sensing, by the radar system, reflections from a user in the radar field;

analyzing, by the radar system, the reflections from the user in the radar field;

providing, by the radar system and based on the analysis of the reflections, radar data;

providing, by a radar-based interaction manager, a multi-mode interface having at least a first mode and a second mode, the multi-mode interface providing a black display, a low-luminosity display, a monochrome display, or a high-luminosity and color saturation display during the first mode;

detecting, by the radar-based interaction manager based on the radar data and during the first mode, a presence or threshold movement of the user in relation to the user device;

responsive to detection of the presence or threshold movement of the user, changing, by the radar-based interaction manager, the multi-mode interface from the first mode to the second mode; and responsive to changing the multi-mode interface to the second mode, providing visual feedback corresponding to the implicit interaction by altering one or more display parameters of the black display, the low-luminosity display, the monochrome display, or the high-luminosity and color saturation display.

Example 20

The method of example 19, wherein:
the first mode comprises one of:
a dormant mode in which the multi-mode interface is in a dormant state and provides the black display;

an ambient mode in which the user device detects the presence of the user within the radar field, the multi-mode interface providing the low-luminosity display during the ambient mode;

an alert mode in which the radar data indicates that the user is reaching toward the user device, the alert mode providing dynamically responsive visual feedback corresponding to movements of the user relative to the user device, the multi-mode interface providing the low-luminosity display or the monochrome display during the alert mode; and an active mode providing full rights to an authenticated user, the multi-mode interface providing the high-luminosity and color saturation display during the active mode;

the dormant mode, the ambient mode, and the alert mode each providing less-than-full rights to the user; and the second mode comprises another one of the dormant mode, the ambient mode, the alert mode, or the active mode that is different than the first mode.

CONCLUSION

Although implementations of techniques for, and apparatuses enabling, a mobile device-based radar system for providing a multi-mode interface have been described in language specific to features and/or methods, it is to be understood that the subject of the appended claims is not necessarily limited to the specific features or methods described. Rather, the specific features and methods are disclosed as example implementations enabling a mobile device-based radar system for providing a multi-mode interface.

What is claimed is:

1. A user device comprising:
   a radar system, implemented at least partially in hardware, configured to:
      provide a radar field;
      sense reflections from a user in the radar field;
      analyze the reflections from the user in the radar field; and
      provide, based on the analysis of the reflections, radar data;
   one or more computer processors; and
   one or more computer-readable media having instructions stored thereon that, responsive to execution by the one or more computer processors, implement a radar-based interaction manager configured to:
      provide a multi-mode interface having:
         a first mode in which the multi-mode interface is in a dormant state and provides a black display; and
         a second mode in which the multi-mode interface provides a low-luminosity display, the second mode providing less-than-full rights to the user;
      detect, based on the radar data and during the first mode, a presence of the user or threshold movement by the user;
      responsive to detection of the presence or threshold movement of the user, change the multi-mode interface from the first mode to the second mode; and
      cause, during the second mode, the multi-mode interface to dynamically adjust at least a luminosity of the low-luminosity display based on movements of a hand of the user toward or away from the user device effective to provide dynamically responsive visual feedback corresponding to the movements of the hand of the user.

2. The user device of claim 1, wherein:
   the user device is a smartphone;
   the movements of the hand of the user toward or away from the smartphone are within a specified distance of the smartphone; and
   in the second mode, the multi-mode interface dynamically adjusts at least the luminosity of the low-luminosity display by:
      increasing the luminosity of the low-luminosity display or of an image displayed via the low-luminosity display in proportion to a rate of decrease in a distance between the hand of the user and the smartphone; and
      decreasing the luminosity of the low-luminosity display or of the image displayed via the low-luminosity display in proportion to a rate of increase in the distance between the hand of the user and the smartphone.

3. The user device of claim 1, wherein:
   the user device is a smartphone;
   the presence or threshold movement of the user is detected within a specified distance of the smartphone; and
   in the second mode, the radar-based interaction manager module is configured to:
      fade one or more shapes or objects in to view as the hand of the user moves toward the smartphone;
      move one or more shapes or objects onscreen toward a specified onscreen-location as the hand of the user moves toward the smartphone; or
      display a curated collection of images or a sequence of images to produce one or more objects or images that respond to the movements and position of the hand of the user relative to the smartphone.

4. The user device of claim 1, wherein:
   the user device is a smartphone; and
   the luminosity of the low-luminosity display or of an image displayed via the low-luminosity display remains in a desaturated state and additional tones are applied to the low-luminosity display or the image to maintain a low-power operational state of the smartphone when the multi-mode interface is in the second mode.

5. The user device of claim 1, wherein:
   the user device is a smartphone;
   the interaction manager is configured to, responsive to the change to the second mode, cause the multi-mode interface to display a lock icon via the low-luminosity display to provide an indication that the smartphone is in a locked state; and
   in the second mode, the lock icon becomes more visible and luminous as the hand of the user moves toward the smartphone.

6. A user device comprising:
   a radar system, implemented at least partially in hardware, configured to:
      provide a radar field;
      sense reflections from a user in the radar field;
      analyze the reflections from the user in the radar field; and
      provide, based on the analysis of the reflections, radar data;
   one or more computer processors; and
   one or more computer-readable media having instructions stored thereon that, responsive to execution by the one or more computer processors, implement a radar-based interaction manager configured to:

provide a multi-mode interface having:
  a first mode in which the multi-mode interface is in a dormant state and provides a black display, the first mode providing less-than-full rights to a user of the user device; and
  a second mode providing full rights to an authenticated user and a high-luminosity and color saturation display;
detect, based on the radar data and during the first mode, a presence of the user or a threshold movement by the user;
responsive to detection of the presence or threshold movement of the user, change the multi-mode interface from the first mode to the second mode; and
cause, during the second mode, the multi-mode interface to provide visual feedback corresponding to the presence or threshold movement by the user by altering one or more display parameters of the black display to provide the high-luminosity and color saturation display.

7. The user device of claim 6, wherein:
the user device is a smartphone;
the altering of the one or more display parameters includes gradually filling an image with color to indicate, through use of the color, that the user has been authenticated and is provided full access rights to the smartphone; and
the altering of the one or more display parameters occurs prior to a presentation of a home screen of the smartphone or as part of the presentation of the home screen.

8. The user device of claim 6, wherein:
the user device is a television;
the user is authenticated via a user-recognition system; and
the visual feedback includes applied visual effects that indicate the user has been authenticated.

9. The user device of claim 8, wherein the applied visual effects include:
one or more objects moving toward and colliding with a lock icon; and
the lock icon being replaced with an unlock icon.

10. The user device of claim 8, wherein the applied visual effects include:
one or more displayed objects appearing to interact with one or more other displayed items.

11. A user device comprising:
a radar system, implemented at least partially in hardware, configured to:
  provide a radar field;
  sense reflections from a user in the radar field;
  analyze the reflections from the user in the radar field; and
  provide, based on the analysis of the reflections, radar data;
one or more computer processors; and
one or more computer-readable media having instructions stored thereon that, responsive to execution by the one or more computer processors, implement a radar-based interaction manager configured to:
  provide a multi-mode interface having:
    a first mode providing less-than-full rights to the user and a low-luminosity display, the low-luminosity display having low-color saturation; and
    a second mode providing full rights to an authenticated user and a high-luminosity and color saturation display;
  detect, based on the radar data and during the first mode, a presence of the user within the radar field;
  responsive to detection of the presence of the user, change the multi-mode interface from the first mode to the second mode; and
  cause, during the second mode, the multi-mode interface to alter one or more parameters of the low-luminosity display by increasing a luminosity and color saturation to transition from the low-luminosity display to the high-luminosity and color saturation display effective to provide visual feedback to the authenticated user.

12. The user device of claim 11, wherein:
the user is authenticated via a user-recognition system; and
the change from the first mode to the second mode is responsive to detection of the presence of the authenticated user.

13. The user device of claim 11, wherein:
the first mode provides an image via the low-luminosity display; and
the one or more parameters of the low-luminosity display are altered by gradually filling the image with color to indicate, through the use of the color, that the user has been authenticated and is provided full access rights to the user device.

14. The user device of claim 11, wherein:
the first mode provides at least one of a clock or a lock icon via the low-luminosity display; and
the second mode provides at least one of the clock or an unlock icon via the high-luminosity and color saturation display.

15. The user device of claim 11, wherein:
the user device is a television;
the user is authenticated via one or more biometric recognition techniques; and
the authenticated user is detected to be present within a specified distance of the television.

16. A user device comprising:
a radar system, implemented at least partially in hardware, configured to:
  provide a radar field;
  sense reflections from a user in the radar field;
  analyze the reflections from the user in the radar field; and
  provide, based on the analysis of the reflections, radar data;
one or more computer processors; and
one or more computer-readable media having instructions stored thereon that, responsive to execution by the one or more computer processors, implement a radar-based interaction manager configured to:
  provide a multi-mode interface having:
    a first mode providing less-than-full rights to the user and a low-luminosity display, the low-luminosity display having low-color saturation, the first mode enabling the radar-based interaction manager to adjust at least a luminosity of the low-luminosity display and cause the multi-mode interface to provide dynamically responsive visual feedback corresponding to movements of a hand of the user toward or away from the user device based on adjustments to at least the luminosity of the low-luminosity display; and
    a second mode providing full rights to an authenticated user and a high-luminosity and color saturation display;

responsive to authentication of the user, change the multi-mode interface from the first mode to the second mode; and responsive to the change to the second mode, cause the multi-mode interface to alter one or more display parameters of the low-luminosity display by increasing the luminosity and a color saturation of the low-luminosity display to transition to the high-luminosity and color saturation display effective to provide visual feedback to the authenticated user.

17. The user device of claim 16, wherein:
the user device is a smartphone; and
prior to the authentication of the user and during the first mode, the radar-based interaction manager is configured to detect, based on the radar data, threshold movement by the user in relation to the user device, the threshold movement being movement of the hand toward the smartphone within a specified distance of the smartphone, the specified distance used as an indication of a user's intent to be authenticated and to interact with the smartphone.

18. The user device of claim 16, wherein:
the user device is a smartphone;
the user is authenticated via a user-recognition system on the smartphone.

19. The user device of claim 16, wherein:
the low-luminosity display includes an image; and
the one or more display parameters are altered by gradually filling the image with color to indicate, through use of the color, that the user has been authenticated and is provided full access rights to the user device.

20. The user device of claim 16, wherein the interactive manager module is further configured to:
detect, based on additional radar data and during the second mode, threshold movement by the user in relation to the user device, the threshold movement including the user moving away from the user device to a distance greater than a specified distance threshold, the specified distance threshold used as an indicator that the user does not intend to interact with the user device;
responsive to detection of the threshold movement of the user, change the multi-mode interface from the second mode to the first mode; and
responsive to the change to the first mode, cause the multi-mode interface to alter the one or more display parameters of the high-luminosity and color saturation display by decreasing the luminosity and color saturation of the high-luminosity and color saturation display to transition to the low-luminosity display.

21. A user device comprising:
a radar system, implemented at least partially in hardware, configured to:
provide a radar field;
sense reflections from a user in the radar field;
analyze the reflections from the user in the radar field; and
provide, based on the analysis of the reflections, radar data;
one or more computer processors; and
one or more computer-readable media having instructions stored thereon that, responsive to execution by the one or more computer processors, implement a radar-based interaction manager configured to:
provide a multi-mode interface having:
a first mode in which the multi-mode interface is in a dormant state and provides a black display; and
a second mode in which the multi-mode interface provides a low-luminosity display;
detect, based on the radar data and during the first mode, a first implicit interaction comprising a presence of the user;
responsive to detection of the presence of the user, change the multi-mode interface from the first mode to the second mode;
cause, during the second mode, the multi-mode interface to provide visual feedback corresponding to the presence of the user by altering one or more display parameters of the black display to transition to the low-luminosity display;
responsive to detection of a second implicit interaction by the user with the user device during the second mode, cause the multi-mode interface to exit the first mode and enter a third mode; and
during the third mode, cause the multi-mode interface to dynamically adjust one or more additional parameters of the low-luminosity display based on movements of the user toward or away from the user device effective to provide dynamic visual feedback that is responsive to the movements of the user.

22. The user device of claim 21, wherein:
the user device is a smartphone;
the second implicit interaction includes a threshold movement by the user toward the smartphone within a specified distance of the smartphone.

23. The user device of claim 21, wherein:
a rate of adjustment of the luminosity of the low-luminosity display during the third mode is based on factors associated with the movement of the user toward or away from the user device; and
the factors include at least one of movement of a hand of the user, distance between the hand and the user device, a speed at which the distance decreases or increases, or a position of the hand relative to the user device.

24. The user device of claim 21, wherein the radar-based interaction manager is further configured to:
during the third mode, detect a hand of the user moving away from the user device; and
responsive to detection of the hand of the user moving away from the user device, cause the multi-mode interface to change to a darkened state by decreasing the luminosity of the low-luminosity display.

25. The user device of claim 24, wherein the radar-based interaction manager is further configured to:
during the third mode, determine that a distance between the hand and the user device is greater than a threshold distance; and
responsive to a determination that the distance between the hand and the user device is greater than the threshold distance, cause the multi-mode interface to exit the third mode and enter the second mode.

26. A user device comprising:
a radar system, implemented at least partially in hardware, configured to:
provide a radar field;
sense reflections from a user in the radar field;
analyze the reflections from the user in the radar field; and
provide, based on the analysis of the reflections, radar data;
one or more computer processors; and
one or more computer-readable media having instructions stored thereon that, responsive to execution by the one or more computer processors, implement a radar-based interaction manager configured to:

provide a multi-mode interface having:
- a first mode in which the multi-mode interface is in a dormant state and provides a black display, the first mode providing less-than-full rights to the user;
- a second mode in which the the multi-mode interface provides a low-luminosity display, the low-luminosity display having low-color saturation, the second mode providing less-than-full rights to the user; and
- a third mode providing full rights to an authenticated user and a high-luminosity and color saturation display;

detect, based on the radar data and during the first mode, a presence of the user within the radar field;

responsive to detection of the presence of the user, change the multi-mode interface from the first mode to the second mode;

responsive to the change to the second mode, cause the multi-mode interface to provide visual feedback corresponding to the presence of the user by altering one or more display parameters of the black display to transition to the low-luminosity display;

responsive to authentication of the user with the user device, cause the multi-mode interface to exit the second mode and enter the third mode; and responsive to the multi-mode interface entering the third mode, cause the multi-mode interface to provide visual feedback corresponding to the authentication of the user by altering a luminosity and a color saturation of the low-luminosity display to transition to the high-luminosity and color saturation display.

27. The user device of claim 26, wherein:
the user is authenticated via a user-recognition system;
the second mode provides an image via the low-luminosity display; and
the altering the luminosity and the color saturation of the low-luminosity display includes gradually filling the image with color to indicate, through the use of the color, that the user has been authenticated and is provided full access rights to the user device.

28. The user device of claim 26, wherein:
the user device is a television; and
the user is authenticated via one or more biometric recognition techniques.

29. The user device of claim 26, wherein:
the user device is a smartphone; and
the user is authenticated via one or more biometric recognition techniques.

30. The user device of claim 26, wherein the interaction manager is configured to:
detect, during the third mode, the user moving away from the user device;
responsive to a distance between the user and the user device being greater than a threshold distance, cause the multi-mode interface to exit the third mode and re-enter the second mode; and
responsive to the multi-mode interface re-entering the ambient mode, cause the multi-mode interface to alter the luminosity and the color saturation of the high-luminosity and color saturation display to transition to the low-luminosity display.

31. A user device comprising:
a radar system, implemented at least partially in hardware, configured to:
provide a radar field;
sense reflections from a user in the radar field;
analyze the reflections from the user in the radar field; and
provide, based on the analysis of the reflections, radar data;

one or more computer processors; and
one or more computer-readable media having instructions stored thereon that, responsive to execution by the one or more computer processors, implement a radar-based interaction manager configured to:

provide a multi-mode interface having:
- a first mode in which the multi-mode interface provides a low-luminosity display, the low-luminosity display having low-color saturation during the ambient mode, the ambient mode providing less-than-full rights to the user;
- a second mode in which the multi-mode interface provides the low-luminosity display and less-than-full rights to the user, the second mode enabling dynamic visual feedback that is responsive to the movements of the user relative to the user device; and
- a third mode in which the multi-mode interface provides a high-luminosity and color saturation display, the third mode providing full rights to an authenticated user;

detect, based on the radar data and during the first mode, a presence of the user within the radar field;

responsive to detection of the presence of the user, change the multi-mode interface from the first mode to the second mode;

cause, during the second mode, the multi-mode interface to adjust at least a luminosity of an image displayed via the low-luminosity display based on movements of the user relative to the user device effective to provide dynamic visual feedback that is responsive to the movements of the user relative to the user device;

responsive to authentication of the user with the user device, cause the multi-mode interface to exit the second mode and enter the third mode; and responsive to the multi-mode interface entering the third mode, increasing the luminosity and color saturation of the low-luminosity display to provide the high-luminosity and color saturation display.

32. The user device of claim 31, wherein the low-luminosity display has a low luminosity defined by a luminosity level that is less than a predefined threshold level, the predefined threshold level corresponding to approximately 50%, 40%, 25% or 15% of a maximum luminosity.

33. The user device of claim 31, wherein:
the user device is a smartphone;
the movements of the user include a hand of the user moving toward or away from the smartphone within a specified distance of the smartphone; and
during the second mode, the multi-mode interface dynamically adjusts at least the luminosity of the low-luminosity display by:
increasing the luminosity of the low-luminosity display or of the image displayed via the low-luminosity display in proportion to a rate of decrease in a distance between the hand of the user and the smartphone; and
decreasing the luminosity of the low-luminosity display or of the image displayed via the low-luminosity display in proportion to a rate of increase in the distance between the hand of the user and the smartphone.

34. The user device of claim 31, wherein:
the user device is a smartphone;
the presence of the user is detected within a specified distance of the smartphone; and
during the second mode, the radar-based interaction manager module is configured to:
fade one or more shapes or objects in to view via the low-luminosity display as a hand of the user moves toward the smartphone;
move one or more shapes or objects onscreen toward a specified onscreen-location as the hand of the user moves toward the smartphone; or
display a curated collection of images or a sequence of images to produce one or more objects or images that respond to movements and position of the hand of the user relative to the smartphone.

35. The user device of claim 31, wherein, when the multi-mode interface adjusts the luminosity of the image, the image remains in a desaturated state to enable the user device to be maintained in a low-power operational state.

36. The user device of claim 31, wherein the radar-based interactive manager module is further configured to:
detect, based on additional radar and during the third mode, threshold movement by the user in relation to the user device, the threshold movement including the user moving away from the user device to a distance greater than a specified distance threshold, the specified distance threshold used as an indicator that the user does not intend to interact with the user device;
responsive to detection of the threshold movement of the user, change the multi-mode interface from the second mode to the first mode; and
responsive to the change to the first mode, cause the multi-mode interface to decrease the luminosity and color saturation of the high-luminosity and color saturation display to transition to the low-luminosity display.

37. A method implemented in a user device, the method comprising:
providing a multi-mode interface having at least a first mode and a second mode, the multi-mode interface providing a low-luminosity display during the first mode and a high-luminosity and color saturation display during the second mode, the first mode providing less-than-full rights to a user, the second mode providing full rights to the user,
the multi-mode interface configured to, during the first mode, adjust at least a luminosity of the low-luminosity display based on movements of a hand of the user toward or away from the user device effective to provide dynamically responsive visual feedback corresponding to the movements of the hand of the user;
obtaining radar data from a radar system when the user device is in a locked state, the radar data representing reflections from a user in a radar field generated by the radar system;
detecting, based on the radar data and during the first mode, a threshold movement by the user in relation to the user device;
responsive to detection of the threshold movement by the user, causing the multi-mode interface to change from the first mode to the second mode; and
responsive to the change to the second mode, causing the multi-mode interface to provide visual feedback corresponding to the threshold movement by the user by altering one or more display parameters of the low-luminosity display to transition to the high-luminosity and color saturation display.

38. The method of claim 37, further comprising:
detecting, during the second mode, that the user is moving away from the user device;
responsive to a distance between the user device and the user being greater than a predefined distance, cause the multi-mode interface to exit the second mode and enter the first mode.

39. The method of claim 37, further comprising, during the first mode, adjusting the at least the luminosity of the low-luminosity display at a first rate that is based on at least a second rate of decreasing distance between the user device and the user's hand effective to provide dynamic visual feedback corresponding to the movements of the user's hand.

40. The method of claim 37, further comprising, responsive to the multi-mode interface entering the second mode, applying color saturation or lighting effects to the low-luminosity display to transition to the high-luminosity and color saturation display effective to provide additional visual feedback corresponding to the authentication of the user.

41. The method of claim 37, wherein:
the user device is a smartphone; and
the threshold movement includes the user nodding or shaking their head while facing the smartphone.

42. The method of claim 37, wherein the user device is a smartphone, and the method further comprises:
authenticating the user via a user-recognition system on the smartphone, wherein the causing the multi-mode interface to change from the first mode to the second mode is performed responsive to authentication of the user.

43. The method of claim 37, wherein:
the low-luminosity display includes an image; and
altering the one or more display parameters includes gradually filling the image with color to indicate, through use of the color, that the user has been authenticated and is provided full access rights to the user device.

44. The method of claim 37, further comprising:
detecting, based on additional radar and during the second mode, additional threshold movement by the user in relation to the user device, the additional threshold movement including the user moving away from the user device to a distance greater than a specified distance threshold, the specified distance threshold used as an indicator that the user does not intend to interact with the user device;
responsive to detection of the additional threshold movement of the user, changing the multi-mode interface from the second mode to the first mode; and
responsive to changing the multi-mode interface to the first mode, causing the multi-mode interface to decrease at least the luminosity and color saturation of the high-luminosity and color saturation display to transition to the low-luminosity display.

45. A method implemented in a user device that includes a radar system, the method comprising:
providing, by the radar system, a radar field;
sensing, by the radar system, reflections from a user in the radar field;
analyzing, by the radar system, the reflections from the user in the radar field;

providing, by the radar system and based on the analysis of the reflections, radar data;

providing, by a radar-based interaction manager, a multi-mode interface having at least a first mode and a second mode, the multi-mode interface providing a black display, a low-luminosity display, a monochrome display, or a high-luminosity and color saturation display during the first mode, wherein:

the first mode comprises one of:
- a dormant mode in which the multi-mode interface is in a dormant state and provides the black display;
- an ambient mode in which the multi-mode interface provides the low-luminosity display;
- an alert mode providing dynamically responsive visual feedback corresponding to movements of the user relative to the user device, the multi-mode interface providing the low-luminosity display or the monochrome display during the alert mode; and
- an active mode providing full rights to an authenticated user, the multi-mode interface providing the high-luminosity and color saturation display during the active mode;

the dormant mode, the ambient mode, and the alert mode each provide less-than-full rights to the user; and the second mode comprises another one of the dormant mode, the ambient mode, the alert mode, or the active mode that is different than the first mode;

detecting, by the radar-based interaction manager based on the radar data and during the first mode, a presence or threshold movement of the user;

responsive to detection of the presence or threshold movement of the user, changing, by the radar-based interaction manager, the multi-mode interface from the first mode to the second mode; and responsive to changing the multi-mode interface to the second mode, providing visual feedback corresponding to the presence or threshold movement of the user by altering one or more display parameters of the black display, the low-luminosity display, the monochrome display, or the high-luminosity and color saturation display.

46. The method of claim 45, wherein:
the user device is a smartphone; and
changing the multi-mode interface from the first mode to the second mode is performed in response to detection of the presence or threshold movement of the user within a specified distance of the smartphone.

47. The method of claim 45, wherein:
the user device is a smartphone;
the multi-mode interface is changed to the ambient mode responsive to detection of the presence of the user within a predefined threshold;
the multi-mode interface is changed to the alert mode responsive to the threshold movement of the user; and
the multi-mode interface is changed to the active mode responsive to authentication of the user to the user device.

48. The method of claim 45, wherein:
the user device is a television; and
changing the multi-mode interface from the first mode to the second mode is performed in response to detection of the presence or threshold movement of the user within a specified distance of the television.

49. The method of claim 45, wherein:
the user device is a home appliance; and
providing visual feedback corresponding to the presence or threshold movement of the user includes increasing a luminosity of one of the black display, the low-luminosity display, the monochrome display, or the high-luminosity and color saturation display to inform the user that the user device has detected the presence or threshold movement of the user and is prepared to respond to interactions of the user with the user device.

* * * * *